United States Patent
Kumar et al.

(10) Patent No.: US 12,223,511 B1
(45) Date of Patent: Feb. 11, 2025

(54) EMOTION ANALYSIS USING DEEP LEARNING MODEL

(71) Applicant: Wells Fargo Bank, N.A., San Francisco, CA (US)

(72) Inventors: Abhishek Kumar, Bangalore (IN); Amit Agarwal, Bangalore (IN); Dipanjan Deb, Bangalore (IN); Naveen Gururaja Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 151 days.

(21) Appl. No.: 17/456,334

(22) Filed: Nov. 23, 2021

(51) Int. Cl.
| | |
|---|---|
| *G06Q 30/016* | (2023.01) |
| *G06V 10/764* | (2022.01) |
| *G06V 10/774* | (2022.01) |
| *G06V 40/20* | (2022.01) |

(52) U.S. Cl.
CPC ......... *G06Q 30/016* (2013.01); *G06V 10/764* (2022.01); *G06V 10/774* (2022.01); *G06V 40/20* (2022.01)

(58) Field of Classification Search
CPC .. G06Q 30/016; G06V 10/764; G06V 10/774; G06V 40/20
See application file for complete search history.

(56) References Cited

U.S. PATENT DOCUMENTS

| | | |
|---|---|---|
| 7,580,512 B2 | 8/2009 | Batni et al. |
| 8,054,964 B2 | 11/2011 | Flockhart et al. |
| 8,983,975 B2 | 3/2015 | Kenton et al. |
| 9,015,046 B2 | 4/2015 | Pereg et al. |

(Continued)

FOREIGN PATENT DOCUMENTS

| | | |
|---|---|---|
| CA | 2957716 C | 11/2016 |
| CA | 2988282 A1 | 6/2018 |

(Continued)

OTHER PUBLICATIONS

Mohamed Mostafa, Modelling and Analysing Behaviours and Emotions via Complex User Interactions. arXiv:1902.07683, Feb. 20, 2019 (Year: 2019).*

(Continued)

*Primary Examiner* — Florian M Zeender
*Assistant Examiner* — Emily M. Kraisinger
(74) *Attorney, Agent, or Firm* — Shumaker & Sieffert, P.A.

(57) ABSTRACT

Techniques are described for generating a set of emotion factor values using one or more machine learning models for customer communications. For example, a computing system includes one or more processors in communication with a memory. The one or more processors are configured to receive communication data of a current communication associated with a customer, apply the communication data to an emotion-based indexer as input wherein the emotion-based indexer includes a set of machine-learning models for a set of emotion factors, generate as output from the emotion-based indexer a set of emotion factor values for the current communication wherein each emotion factor value indicates the measure of a particular emotion factor in the current communication, apply the set of emotion factor values to an emotion classification model, and classify the current communication into an emotion state based on the set of emotion factor values.

18 Claims, 7 Drawing Sheets

(56) References Cited

U.S. PATENT DOCUMENTS

| | | | |
|---|---|---|---|
| 9,026,476 | B2 | 5/2015 | Bist |
| 9,093,081 | B2 | 7/2015 | Laperdon et al. |
| 9,129,290 | B2 | 9/2015 | Kannan et al. |
| 9,299,268 | B2 | 3/2016 | Aravkin et al. |
| 9,483,768 | B2 * | 11/2016 | Singh .................. G06Q 30/016 |
| 9,536,269 | B2 | 1/2017 | Chang et al. |
| 9,710,459 | B2 | 7/2017 | Baldwin et al. |
| 9,824,403 | B2 | 11/2017 | Gangadharaiah et al. |
| 9,967,400 | B2 | 5/2018 | Eftekhari et al. |
| 10,111,611 | B2 | 10/2018 | El Kaliouby et al. |
| 10,360,526 | B2 | 7/2019 | Balakrishnan et al. |
| 10,410,125 | B1 | 9/2019 | Finkelstein et al. |
| 10,489,451 | B2 | 11/2019 | Fujita et al. |
| 10,489,845 | B2 | 11/2019 | Mullakkara Azhuvath et al. |
| 10,691,407 | B2 | 6/2020 | Yoo et al. |
| 10,728,393 | B2 | 7/2020 | Eftekhari et al. |
| 10,748,644 | B2 | 8/2020 | Shriberg et al. |
| 10,896,428 | B1 | 1/2021 | Balasubramaniam et al. |
| 11,451,666 | B1 | 9/2022 | Biswas |
| 11,900,407 | B1 | 2/2024 | Kalra et al. |
| 2001/0056349 | A1 | 12/2001 | St. John |
| 2003/0097329 | A1 | 5/2003 | Nabe et al. |
| 2003/0130933 | A1 | 7/2003 | Huang et al. |
| 2005/0175167 | A1 | 8/2005 | Yacoub et al. |
| 2006/0285665 | A1 | 12/2006 | Wasserblat et al. |
| 2008/0086690 | A1 | 4/2008 | Verma et al. |
| 2009/0222313 | A1 | 9/2009 | Kannan et al. |
| 2013/0035983 | A1 | 2/2013 | Kursar et al. |
| 2014/0163960 | A1 | 6/2014 | Dimitriadis et al. |
| 2014/0365272 | A1 | 12/2014 | Hurewitz |
| 2015/0213002 | A1 | 7/2015 | Gou et al. |
| 2016/0335252 | A1 | 11/2016 | Brunet et al. |
| 2017/0228745 | A1 | 8/2017 | Garcia et al. |
| 2019/0050875 | A1 * | 2/2019 | McCord ................ G06F 40/237 |
| 2019/0147043 | A1 | 5/2019 | Moskowitz |
| 2019/0318219 | A1 | 10/2019 | Arora et al. |
| 2019/0325897 | A1 | 10/2019 | Liu et al. |
| 2020/0013071 | A1 | 1/2020 | Sri et al. |
| 2020/0020454 | A1 | 1/2020 | McGarvey et al. |
| 2020/0074156 | A1 | 3/2020 | Janumpally et al. |
| 2020/0082056 | A1 | 3/2020 | Hasegawa |
| 2020/0106882 | A1 | 4/2020 | Fang et al. |
| 2020/0160356 | A1 | 5/2020 | Mccord |
| 2020/0294670 | A1 | 9/2020 | Kotikela et al. |
| 2021/0089624 | A1 | 3/2021 | Bealby-Wright et al. |
| 2021/0350385 | A1 | 11/2021 | Ellison et al. |
| 2022/0103589 | A1 | 3/2022 | Shen |
| 2022/0385675 | A1 | 12/2022 | Tora et al. |

FOREIGN PATENT DOCUMENTS

| | | | |
|---|---|---|---|
| CN | 103811009 | A | 5/2014 |
| CN | 102831184 | B | 3/2016 |
| CN | 106022676 | A | 10/2016 |
| CN | 106530127 | A | 3/2017 |
| CN | 106539804 | A | 3/2017 |
| CN | 107908782 | A | 4/2018 |
| CN | 108108352 | A | 6/2018 |
| CN | 108108433 | A | 6/2018 |
| CN | 110516593 | A | 11/2019 |
| CN | 111048075 | A | 4/2020 |
| CN | 111049998 | A | 4/2020 |
| CN | 111324865 | A | 6/2020 |
| CN | 111767736 | A | 10/2020 |
| CN | 112182361 | A * | 1/2021 |
| IN | 201841033441 | A | 3/2020 |
| JP | 2018180628 | A | 11/2018 |
| KR | 101600509 | B1 | 2/2016 |
| KR | 20190053982 | A | 5/2019 |
| KR | 20200005753 | A | 1/2020 |
| WO | 0116892 | A1 | 3/2001 |
| WO | 2015087323 | A1 | 6/2015 |
| WO | 2019222742 | A1 | 5/2019 |
| WO | 2020056519 | A1 | 3/2020 |

OTHER PUBLICATIONS

"Emotion Analysis", Komprehend, retrieved from https://www.paralleldots.com/emotion-analysis, Nov. 30, 2020, 8 pp.

"Hyper-Personalization: The Next Wave of Customer Engagement", SmartKarrot Inc., Retrieved from: https://medium.com/smartkarrot/hyper-personalization-the-next-wave-of-customer-engagement-9e68c7a7c9ad, Mar. 15, 2019, 8 pp.

"Loughran-McDonald Sentiment Word Lists Financial dictionary", Retrieved from https://sraf.nd.edu/textual-analysis/resources/, Nov. 30, 2020, 4 pp.

Chew-Yean, "Emotion Detection and Recognition from Text Using Deep Learning" Devblogs, Nov. 29, 2015, 8 pp.

Hsiao et al., "A novel framework for customer complaint management," The Service Industries Journal: vol. 36, No. 13-14, Feb. 12, 2016, 675-698 pages.

Luo et al., "Beyond Polarity: Interpretable Financial Sentiment Analysis with Hierarchical Query-driven Attention", IJCAI'18: Proceedings of the 27th International Joint Conference on Artificial Intelligence, Jul. 13, 2018, 4244-4250 pp.

McQuilken et al., "The influence of guarantees, active requests to voice and failure severity on customer complaint behavior," International Journal of Hospitality Management, vol. 30, Issue 4, Dec. 2011, 953-962 pages.

Mohammad, "Obtaining reliable human ratings of valence, arousal, and dominance for 20,000 english words", Association for Computational Linguistics, Jul. 15-20, 2018, 11 pp.

Park et al., "Emotion Recognition from Text Stories Using an Emotion Embedding Model", IEEE, Apr. 20, 2020, 5 pp.

Tsai et al., "Financial keyword expansion via continuous word vector representations", In Proceedings of the 2014 Conference on Empirical Methods in Natural Language Processing (EMNLP), Oct. 25-29, 2014, 1453-1458 pp.

U.S. Appl. No. 17/338,167, filed Jun. 3, 2021, naming inventors Kumar et al.

U.S. Appl. No. 17/359,102, filed Jun. 25, 2021, naming inventors Kumar et al.

U.S. Appl. No. 17/397,494, filed Aug. 9, 2021, naming inventors Kumar et al.

U.S. Appl. No. 17/647,970, filed Jan. 13, 2022, naming inventors Kumar et al.

U.S. Appl. No. 17/647,971, filed Jan. 13, 2022, naming inventors Kumar et al.

Wang et al., "Financial sentiment analysis for risk prediction", International Joint Conference on Natural Language Processing, Oct. 14-18, 2013, 802-808 pp.

Mostafa et al., "Modelling and Analysing Behaviours and Emotions via Complex User Interactions", arXiv:1902.07683, Feb. 20, 2019, 176 pp.

Schrauwen, "Machine Learning Approaches To Sentiment Analysis Using the Dutch Netlog Corpus", Computational Linguistics & Psycholinguistics Technical Report Series, Jul. 2010, 78 pp.

Lewenberg et al., "Using emotions to predict user interest areas in online social networks", 2015 IEEE International Conference on Data Science and Advanced Analytics (DSAA), IEEE, Oct. 2015, pp. 1-10.

* cited by examiner

EMOTION ANALYSIS USING DEEP LEARNING MODEL

TECHNICAL FIELD

The disclosure relates to computing systems, and more specifically, computing systems executing models configured to detect patterns.

BACKGROUND

A customer service contact center is a facility configured to handle incoming messages from customers or potential customers of a business or organization. One function of the contact center is to handle customer communications, such as complaints, focused on one or more services provided by the business. Although many customer communications can be handled through online interactions (e.g., via websites, email, or mobile applications), for some businesses a contact center may be regarded as necessary. A contact center may include one or more message analysis systems and one or more agent desktop systems used by a number of human agents that are representatives of the organization.

Sentiment analysis seeks to extract subjective information, such as affective states, from communications. Generally, an algorithm assigns an emotional scale to certain words or phrases in text to classify the polarity of the text as a whole. The polarity is expressed as either positive, negative, or neutral.

SUMMARY

In general, this disclosure describes techniques for determining the emotive content of customer communications associated with a business or organization using an emotion-based indexer deep learning model and an emotion classifier. More specifically, a computing system may receive data associated with one or more customer communications (e.g., text and annotated data from text-, voice-, and/or video-based customer communications, such as communications). The computing system applies the data for a customer communication as input to the emotion-based indexer deep learning model to determine a set of emotion factor values (e.g., numerical values representing emotion factors) for the customer communication as output. The computing system then applies the emotion factor values for the customer communication, along with historical emotion factor values for previous customer communications as input to a use case specific emotion classifier. In accordance with the techniques described in this disclosure, the emotion classifier may comprise an emotion classification model configured to classify the current communication into an emotional state according to the emotional content of the communication based the emotion factor values.

In some examples, a computing system includes a memory and one or more processors in communication with the memory and configured to: receive communication data of a current communication associated with a customer; apply the communication data to an emotion-based indexer running on the one or more processors as input, wherein the emotion-based indexer includes a set of machine learning models for a set of emotion factors, each machine learning model trained to determine a measure of a particular emotion factor of the set of emotion factors; generate, as output from the emotion-based indexer, a set of emotion factor values for the current communication, wherein each emotion factor value of the set of emotion factor values indicates the measure of the particular emotion factor in the current communication; apply the set of emotion factor values for the current communication to an emotion classification model running on the one or more processors as input; and classify, using the emotion classification model, the current communication into an emotion state based on the set of emotion factor values for the current communication associated with the customer.

In some examples, this disclosure is directed to a method comprising: receiving, by one or more processors, communication data of a current communication associated with a customer; applying, by one or more processors, the communication data to an emotion-based indexer running on the one or more processors as input, wherein the emotion-based indexer includes a set of machine learning models for a set of emotion factors, each machine learning model trained to determine a measure of a particular emotion factor of the set of emotion factors; generating, by one or more processors, as output from the emotion-based indexer, a set of emotion factor values for the current communication, wherein each emotion factor value of the set of emotion factor values indicates the measure of the particular emotion factor in the current communication; applying, by one or more processors, the set of emotion factor values for the current communication to an emotion classification model running on the one or more processors as input; and classifying, by one or more processors, using the emotion classification model, the current communication into an emotion state based on the set of emotion factor values for the current communication associated with the customer.

In some examples, this disclosure is directed to a computer-readable medium comprising instructions that, when executed, cause one or more processors to: receive communication data of a current communication associated with a customer; apply the communication data to an emotion-based indexer running on the one or more processors as input, wherein the emotion-based indexer includes a set of machine learning models for a set of emotion factors, each machine learning model trained to determine a measure of a particular emotion factor of the set of emotion factors; generate, as output from the emotion-based indexer, a set of emotion factor values for the current communication, wherein each emotion factor value of the set of emotion factor values indicates the measure of the particular emotion factor in the current communication; apply the set of emotion factor values for the current communication to an emotion classification model running on the one or more processors as input; and classify, using the emotion classification model, the current communication into an emotion state based on the set of emotion factor values for the current communication associated with the customer.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
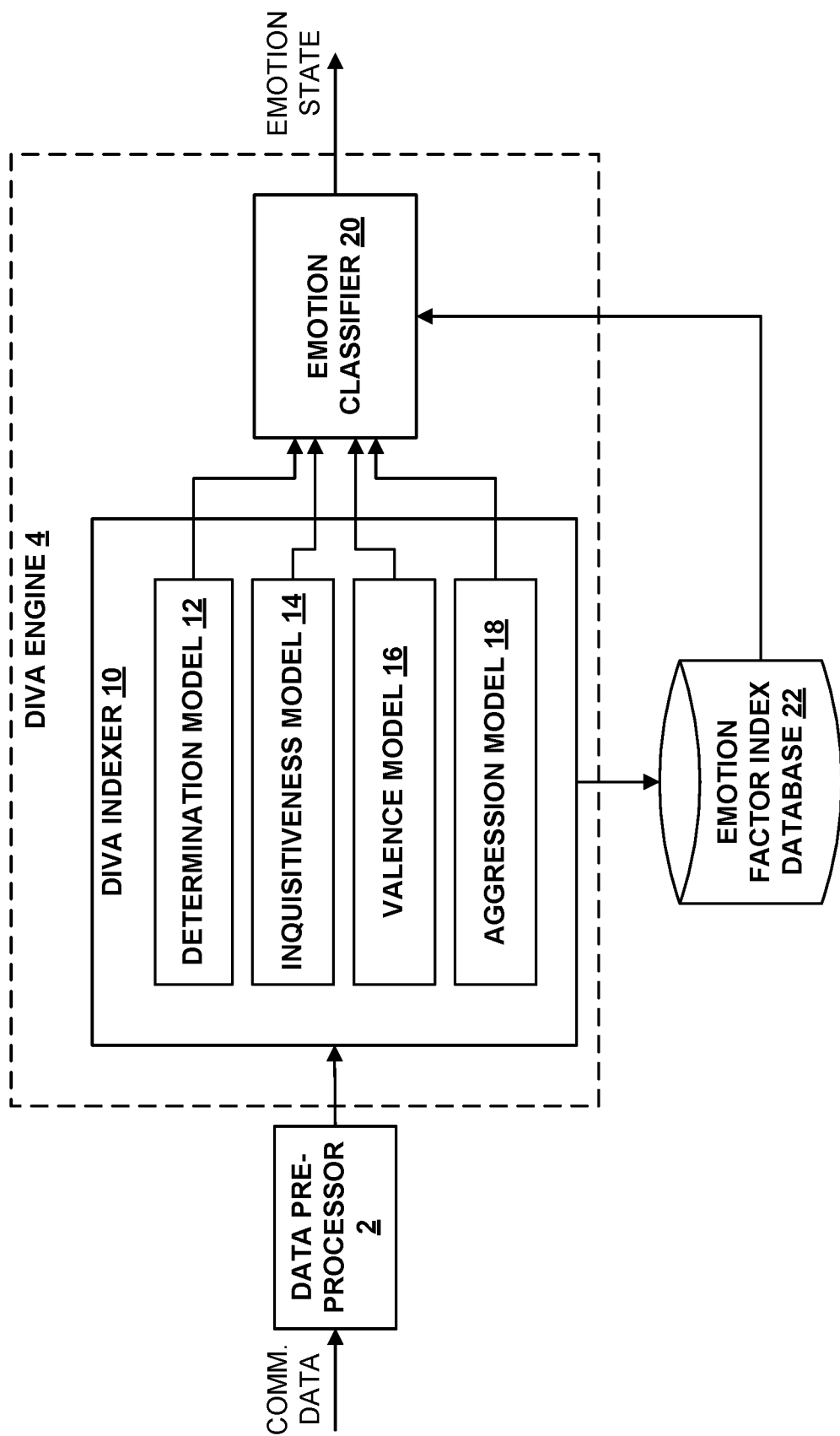
FIG. 1 is a block diagram illustrating an example operation of an emotion classification engine in accordance with techniques of this disclosure.

FIG. 1 is a block diagram illustrating an example operation of an emotion classification engine in accordance with techniques of this disclosure.

The emotion classification engine illustrated in FIG. 1 is DIVA engine 4, which refers to the four emotion factor values of Determination, Inquisitiveness, Valence, and Aggression that the engine is configured to determine from input communication data and use to classify the communication data as being associated with a given emotion state. In the illustrated example of FIG. 1, DIVA engine 4 includes a DIVA indexer 10 and an emotion classifier 20. The DIVA indexer 10 may comprise four machine learning models trained to output the four different emotion factor values for communication data. The emotion factor values may be represented as numerical numbers (e.g., between 0 and 1, between −2 and 2, or the like) reflecting the intensity of a specified emotion present in the communication data. For communication data representing a customer communication, for example, a determination model 12 may be trained to output a determination value, an inquisitiveness model 14 may be trained to output an inquisitiveness value, a valence model 16 may be trained to output a valence value, and an aggression model 18 may be trained to output an aggression value. DIVA indexer 10 may output the four emotion factor values to an emotion classifier 20, which may be a machine learning model or a rule-based model, configured to classify the communication data into an associated emotion state (e.g., angry, curious, happy, etc.) based on the four emotion factor values.

DIVA engine 4 may be supported on one or more servers or other computing systems or devices within an organization network. For example, DIVA engine 4 may comprise software code executing on processors or processing circuitry of one or more computing systems that may be included in a centralized or distributed network of disparate computing devices. In some examples, one or more of the emotion factor models 12, 14, 16, and 18 and emotion classifier 20 may each be supported by different computing systems or devices within the network. In other examples, DIVA indexer 10 may be supported on the same computing system, and emotion classifier 20 may be supported on the same computing system or a different computing system within the network.

Upon receipt of communication data representing a customer communication for processing, data pre-processor 2 may perform preprocessing to prepare the communication data for application to the DIVA engine 4 machine learning models. The communication data representing a customer communication may also be saved to a database in memory.

The four machine learning models 12, 14, 16, and 18 of DIVA indexer 10 are trained to recognize certain emotion factors within communication data and output emotion factor values reflecting the presence and intensity of those emotions. The emotion factor values output from DIVA indexer 10 may be saved to an emotion factor index database 22 and an identification number may be assigned to the communication data in memory to associate the communication data with the emotion factor values. The saved emotion factor values may also be associated with a customer who is the source of the communication data. In some examples, the emotion classifier 20 may also retrieve historic, saved emotion factor values for previous communication data associated with the customer from the emotion factor index database 22 as additional input to determine an emotion state of current communication data of the customer. The use of historic emotion factor values of the customer may enable emotion classifier 20 to more accurately classify an emotion state of a customer associated with the current communication data by identifying trends or sudden changes in the emotion factor values of the customer over time. Emotion states may be saved to an emotion state database (not shown in FIG. 1) and associated with the respective communication data, originating customer, and/or emotion factor values.

In some examples, instead of only relying on the specific customer's own historic emotion factor values, emotion classifier 20 may use historic emotion factor values associated with a grouping or profile of customers that includes the specific customer. For example, customer profiles may be identified for groups of customers based on geographical location, education level, age, profession, socioeconomic status, or other categorization. The use of customer profiles may provide a larger historic data set from which emotion classifier 20 may learn to identify emotional trends over time.

Conventional sentiment analysis systems generally classify communication data as being positive, neutral, or negative. Unlike these conventional systems, the emotion classification engine described herein, e.g., DIVA engine 4 of FIG. 1, includes an indexer, e.g., DIVA indexer 10 of FIG. 1, configured to identify the existence and intensity of four emotions specifically useful for financial institutions when handling customer communications. In addition, the machine learning models included within the indexer, e.g., models 12, 14, 16, and 18 of FIG. 1, may be trained using communication data received by financial institutions, rather than general communication data from different environments. In this way, the training of the machine learning models within DIVA indexer 10 may be more specific to financial institutions and more accurate in identifying emotive content in communications with a financial institution.

The four emotion factor values output by the machine learning models within DIVA indexer 10 may correspond to a customer's perceived determination, inquisitiveness, valence, and aggression within an inquiry, complaint, or other customer communication. The determination factor value may correspond to a level of purposefulness of the speech of the customer. In some examples, a customer communication that is highly focused on a specific topic may have a high determination factor value. In some examples, a customer communication that repeats itself may have a high determination factor value. In some examples, a customer communication that makes only a short, single statement or a broad, indefinite statement may have a low determination factor value.

The inquisitiveness value may be a measure of the level of curiosity of the speech of the customer communication. In some examples, a customer service inquiry that is probing for information about various aspects of the customer's account or the organization may have a high inquisitiveness value. In some examples, the customer communication that does not indicate an interest in learning anything may have a low inquisitiveness value. The customer who submits a communication with a low inquisitiveness value may wish to resolve any issues without receiving further information.

The valence value may be a measure of the attitude conveyed by the speech of the customer. In some examples, a customer communication that is very negative may have a low valence value. In some examples, a customer communication that is cheerful may have a high valence value. The aggression value may be a measure of the aggressiveness of the speech of the customer communication. In some examples, a customer communication that is brusque may have a high aggression value. In some examples, a customer communication that uses an authoritative tone of voice may have a high aggression value. In some examples, a customer communication that sounds meek or pathetic may have a low aggression value.

An emotion classifier, e.g., emotion classifier 20 of FIG. 1, within the emotion classification engine described herein is configured to classify an emotional state of the customer communication based at least in part on the four emotion factor values output from the machine learning models within DIVA indexer 10 for the customer communication. In some examples, emotion classifier 20 may comprise a machine learning-based or rule-based algorithmic model configured to map the emotion factor values for the customer communication to an emotional state, emotion score, or other emotional indicator. In one example, emotion classifier 20 may have access to a library of emotional states algorithmically tied to different combinations of emotion factor value inputs. The emotional state library may contain emotion states such as "curious," "trusting," "disgruntled," "interesting" etc. As described in this disclosure, the emotion classifier included within the emotion classification engine described herein may be use case specific. In accordance with the techniques described in this disclosure, the emotion classifier may comprise an emotion classification model configured to classify the current communication into an emotional state based on the emotion factor values.

DIVA indexer 10 and emotion classifier 20 may include functions (e.g., machine learning algorithms and/or rule-based algorithms) configured to be executed by processors. In some examples, the machine learning models within DIVA indexer 10 implement supervised learning, e.g., classify sets of data into groups. For example, a set of data, such as a sequence of code pairs representing customer communication data, may be classified into four values (determination, inquisitiveness, valence, and aggression). The function may include nodes, layers, and connections, and the function may be represented by equations having a plurality of variables and a plurality of known coefficients.

Machine learning algorithms, such as those of DIVA engine 4, may be trained using a training process to create data-specific models. After the training process, the created models may be capable of determining an output data set based on an input data set (e.g., match a sequence of text data strings representing a customer service inquiry to one or more known emotion factor values or emotion states). The training process may implement one or more sets of training data to create the models.

A computing system may be configured to train the deep learning models of the DIVA indexer (determination model 12, inquisitiveness model 14, valence model 16, and aggression model 18) based on a set of training data that includes a plurality of customer communications in one or more memories or storage systems within the organization network, in which each customer communication of the plurality of customer communications is pre-categorized as associated with at least one emotion factor value. The deep learning models may include an artificial neural network, such as an RNN. During training of the model, an RNN may identify a plurality of patterns in a plurality of sequences of events. For example, the RNN may observe word phrases of customer communications known to be indicative of an aggressive emotion. After the model is trained, the model may accept a customer communication as an input and output an emotion factor value (e.g., an integer between −2 and 2, inclusive) as an output, a process known as sequence classification.

A computing system may be configured to train a deep learning model like emotion classifier 20 based on a set of training data that includes a plurality of emotion factor value sets in one or more memories or storage systems within the organization network, in which each set of emotion factor values the plurality of sets of emotion factor values is pre-categorized as associated with at least a certain emotion state. The deep learning model may include an artificial neural network, such as an RNN. During training of the model, an RNN may identify a plurality of patterns in a plurality of sequences of events. For example, the RNN may observe emotion factor value combinations known to be indicative of a depressed emotion. After the model is trained, the model may accept a set of emotion factor values as an input and output an emotion classification (e.g., angry, interested, joyful, trusting, depressed, etc.) as an output, a process known as sequence classification.

The DIVA engine 4 may be implemented on any suitable computing system, such as one or more server computers, workstations, mainframes, appliances, cloud computing systems, and/or other computing systems that may be capable of performing operations and/or functions described in accordance with one or more aspects of the present disclosure. In some examples, the DIVA engine 4 may be implemented on a computing system that represents a cloud computing system, server farm, and/or server cluster (or portion thereof) that provides services to customer devices and other devices or systems, e.g., agent workstations within a financial institution. In other examples, the DIVA engine 4 may represent or be implemented through one or more virtualized compute instances (e.g., virtual machines, containers) of a data center, cloud computing system, server farm, and/or server cluster.

Figure 2:
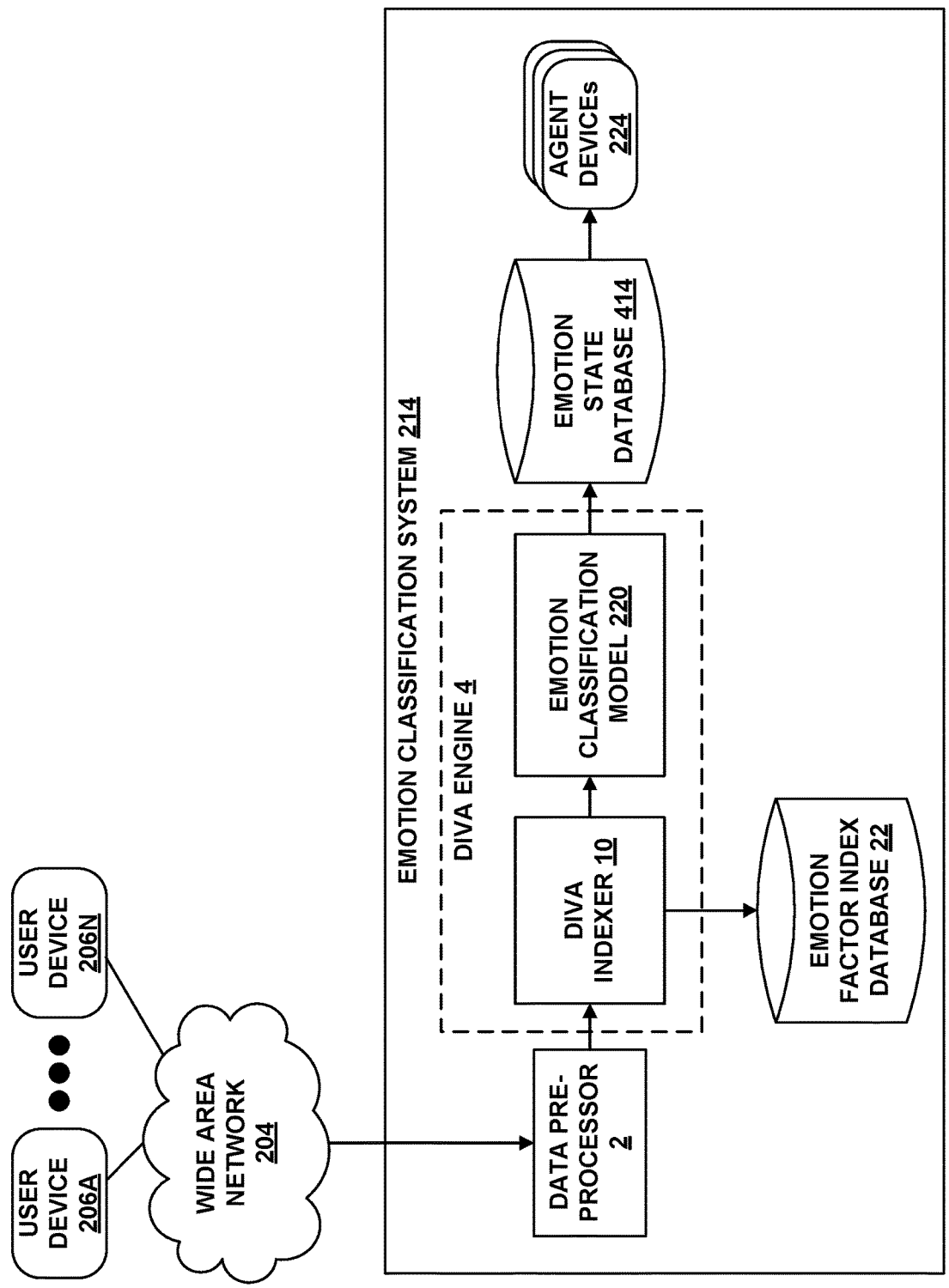
FIG. 2 is a block diagram illustrating an example emotion classification system, in accordance with the techniques of this disclosure.

FIG. 2 is a block diagram illustrating an example emotion classification system 214, in accordance with the techniques of this disclosure. The emotion classification system includes DIVA engine 4 as described in FIG. 1 in which the emotion classifier is a use case specific emotion classification model 220 configured to classify a customer communication into an emotion state based on emotion factor values output by the machine learning models of DIVA indexer 10.

As illustrated in FIG. 2, one or more user devices 206A-206N (collectively "user devices 206") are in communication with emotion classification system 214 via a network 204. Emotion classification system 214 may comprise a network run partially on devices in a facility configured to handle incoming messages from user devices 206 operated by users that may be customers or potential customers of a business or organization. Emotion classification system 214 may include several disparate computing systems configured to handle customer communications focused on customer accounts with the business or other services provided by the business, e.g., servicing existing accounts, opening new accounts, servicing existing loans, and opening new loans. In some examples described in this disclosure, emotion classification system 214 may comprise a customer service center of a bank or other financial institution. A contact center of the emotion classification system 214 may allow customers to speak to a live person when resolving service issues and/or leave a voice message detailing one or more service issues. Additionally, or alternatively, customers may submit messages (e.g., communications or complaints) via text channels such as email, text messaging, and social media messaging.

User devices 206 may be any suitable communication or computing device, such as a conventional or landline phone, or a mobile, non-mobile, wearable, and/or non-wearable computing device capable of communicating over network 204. For example, each user device of user devices 206 may include any one or combination of a landline phone, a conventional mobile phone, a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, and non-mobile computing device that may perform operations in accordance with one or more aspects of the present disclosure. One or more of user devices 206 may support communication services over packet-switched networks, e.g., the public Internet, including Voice over Internet Protocol (VOIP). One or more of user devices 206 may also support communication services over circuit-switched networks, e.g., the public switched telephone network (PSTN).

Each of user devices 206 is operated by a user that may be a customer or a potential customer of the business or organization that provides emotion classification system 214. In the case of a business or corporate customer, the user may be a representative of the business or a corporate customer. In some examples, the user may be a customer who interacts with the business or organization through account inquiries, service inquiries etc. In one or more cases where the user has previously interacted with the business or organization by communications sent to the business or organization, the emotion factor values and emotion states for those communications may be stored in databases in memory of emotion classification system 214.

The emotion classification system 214 may comprise one or more physical entities (e.g., computing devices, computer servers, quantum computers, desktop computers, tablet computers, laptop computers, smartphones, etc.) and/or virtual entities (e.g., virtual machines, application software in computing machines, a cloud computing system, etc.). In certain examples, the emotion classification system 214 may include one or more computers that process information and/or devices with embedded computers.

Network 204 and emotion classification system 214 may comprise computer networks (e.g., a wide area network (WAN), such as the Internet, a local area network (LAN), or a virtual private network (VPN)), a telephone network (e.g., the PSTN or a wireless network), or another wired or wireless communication network. Although illustrated as single entities, each of network 204 and emotion classification system 214 may include a combination of multiple networks. In some examples, network 204 may comprise a public network or a private access network through which user devices 206 may access emotion classification system 214. In some examples, emotion classification system 214 may comprise a private network of a business or organization, e.g., a bank or other financial institutions.

Emotion classification system 214 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, emotion classification system 214 represents cloud computing systems, server farms, and/or server clusters (or portions thereof) that provide services to customer devices and other devices or systems. In other examples, emotion classification system 214 may represent or be implemented through one or more virtualized compute instances (e.g., virtual machines, containers) of a data center, cloud computing system, server farm, and/or server cluster. Emotion classification system 214 may communicate with external systems via one or more networks (e.g., network 204). In some examples, emotion classification system 214 may use network interfaces (such as Ethernet interfaces, optical transceivers, radio frequency (RF) transceivers, Wi-Fi or Bluetooth radios, or the like), telephony interfaces, or any other type of device that can send and receive information to wirelessly communicate with external systems, e.g., network 204, user device 206, agent devices 224, etc.

Emotion classification system 214 may include a centralized or distributed network of disparate computing systems made up of interconnected desktop computers, laptops, workstations, wireless devices, network-ready appliances, file servers, print servers, or other computing devices. For example, emotion classification system 214 may include one or more data centers including a plurality of servers configured to provide account services interconnected with a plurality of databases and other storage facilities in which customer credentials, customer profiles, and customer accounts are stored.

Emotion classification system 214 may include systems with which a user may interact, including one or more agent devices 224 used by a number of human agents that are representatives of the business or organization. The one or more agent devices 224 may be configured to display or otherwise provide data about the customer or the customer's communications with the business or organization to the human agents, including current and/or historic emotion states for communications from the customer.

In the illustrated example of FIG. 2, emotion classification system 214 also includes data pre-preprocessor 2, DIVA engine 4 that includes one or more machine learning models within DIVA indexer 10, as described with respect to FIG. 1, and emotion classification model 220. Data pre-processor 2 may prepare communications data received from user device 206 for application to the one or more machine learning models within DIVA engine 4. Emotion classification system 214 may also include components necessary for collecting, storing, and maintaining data used by emotion classification system 214. The architecture of emotion classification system 214 illustrated in FIG. 2 is shown for exemplary purposes only and should not be limited to this architecture. In other examples, emotion classification system 214 may include more, fewer, or different computing systems configured to handle customer messages.

In some examples, emotion classification system 214 receives an inbound message from a user device, e.g., user device 206A, via network 204 and determines whether to route the inbound message to data pre-processor 2. In accordance with one or more techniques of this disclosure, the message may comprise communication data in the form of text or audio, such as emails, scanned letters, online chat, telephone calls, etc. A speech recognition model may be used to convert audio customer service inquiries to plain text data via natural language processing. A text image recognition model may be used to convert hand- or typewritten customer service inquiries to plain text data or text-based annotation data.

Text-based annotation data may be a combination of two sets of plain text data. The first set of plain text data may comprise the words and/or text of a customer's message to an organization, while the second set of plain text data may comprise annotations by an agent of the organization. In some examples, the customer may send communication data to an organization in the form of a visual data (e.g., letter, fax, video call, etc.), or audio data (e.g., phone call, web call, video call, etc.). The visual or audio data may have indications of emotive content not captured by the words of the message alone. In that case, an agent of the organization may add annotations, in the form of plain-text data, to the communication data for the customer's message. For example, annotations may describe the customer's behavior during a phone call, including shouting, pleading, sincere gratitude, and other descriptions of displayed emotion not conveyed through the words of the conversation alone. In some examples, annotations may describe a letter as smudged with tears, or showing red circle marks around certain words, and other descriptions of displayed emotion not conveyed through the words in the letter alone.

Data pre-processor 2 may prepare communication data indicative of a customer interaction/message for submission to the machine learning models of DIVA engine 4. The machine learning models of DIVA indexer 10 may receive pre-processed communication data as input, and output a set of four emotion factor values indicative of the emotive content of the communication data. The four emotion factor values may include a determination value, an inquisitiveness value, a valence value, and an aggression value. The set of emotion factor values may be stored in an emotion factor index database 22 along with a time stamp and associated with the communication data as well as the customer associated with the communication data. An emotion classification model 220 may use the current emotion factor value set as input, as well as one or more historic emotion factor value sets from the emotion factor index database 22 corresponding to historic communications associated with the customer over time, where the historic communications occurred prior to the current communication. Emotion classification model 220 may classify the current communication into an emotion state (e.g., "angry," "scared," "nervous," "excited") according to the emotive content of the current communication based on the current emotion factor value set and/or historic emotion factor value sets. Emotion classification system 214 may store the emotion state in emotion state database 414 and assign an ID to the emotion factor value sets in emotion factor index database 22 to associate the set or sets with the communication data and the emotion state.

Emotion state database 414 may contain a plurality of emotional states, where each of the plurality of emotion states is associated with one or more messages from one or more customers with similar emotive contents. The similar emotive contents may be represented by similar emotion factor values determined for the messages received from the customers. In some examples, an emotion state may be a string category. For example, the different states could be titled "frustrated," "angry," "curious," or "cheerful." In another example, an emotion state may be a numeric category (e.g., one through ten) representing the negativity or positivity of the message, where messages classified in category one have the most positive content and messages in category ten have the most negative content.

In some examples, emotion classification model 220 may transmit the emotion state to one or more agent devices 224 for use in determining how to handle the current communication. In some examples, emotion classification system 214 may transmit the emotion state to one or more agent devices from emotion state database 414. Although FIG. 2 depicts a flow of information to agent devices 224 only through emotion state database 414, in some examples agent devices 224 may receive information directly from emotion classification model 220, and in some examples, agent devices 224 may receive information directly from emotion state database 414. In some examples, emotion classification model 220 or emotion classification system 214 may transmit the emotion state automatically from emotion classification model 220 or emotion state database 414 to agent devices 224 after a message is received and classified with the emotion state. In some examples, an agent operating one or more agent devices 224 may request the emotion state from emotion state database 414 when the agent is ready to begin work associated with the message. In some examples, agent devices 224 and/or emotion classification system may retrieve the emotion state for a customer message from emotion state database 414 when considering whether to solicit to the customer associated with the message, when determining what order in which to respond to customer messages, when determining whether a customer message may be fraudulent, when routing a customer message to a particular agent or agents capable of most effectively responding to the customer, when considering loan risks for the customer, or in any other scenario where the emotion state may assist in the decisions and processes of the business or organization.

By taking into account the emotive content of customer communications, emotion classification system 214 may provide more effective and informed services to customers of the business or organization.

Figure 3:
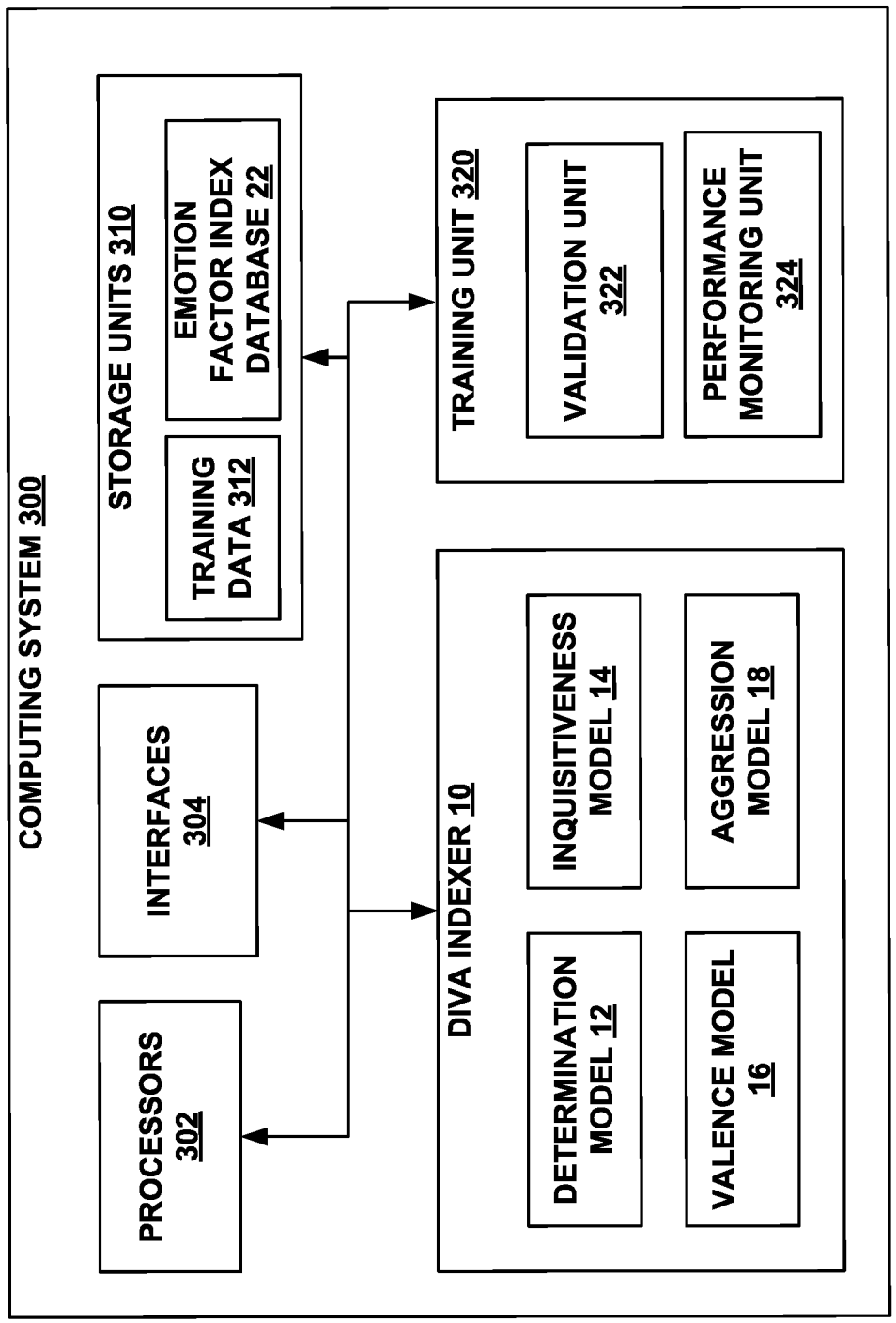
FIG. 3 is a block diagram illustrating an example computing system for running a DIVA indexer, in accordance with the techniques of this disclosure.

FIG. 3 is a block diagram illustrating an example computing system 300 for running a DIVA indexer, in accordance with the techniques of this disclosure. The architecture of computing system 300 illustrated in FIG. 3 is shown for exemplary purposes only. Computing system 300 should not be limited to the illustrated example architecture. In other examples, computing system 300 may be configured in a variety of ways.

As shown in the example of FIG. 3, a computing system 300 includes one or more processors 302, one or more interfaces 304, and one or more storage units 310. The one or more storage units 310 may house training data 312, and an emotion factor index database 22. The computing system 300 also includes the DIVA indexer 10, and a training unit 320, which may be implemented as program instructions and/or data stored in the storage units 310 and executable by the processors 302. The DIVA indexer 10 may comprise a determination model 12, an inquisitiveness model 14, a valence model 16, and an aggression model 18.

Computing system 300 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 300 represents a cloud computing system, server farm, and/or server cluster (or portion thereof) that provides services to customer devices and other devices or systems. In other examples, computing system 300 may represent or be implemented through one or more virtualized compute instances (e.g., virtual machines, containers) of a data center, cloud computing system, server farm, and/or server cluster.

The storage units 310 of computing system 300 may also store an operating system (not shown) executable by the processors 302 to control the operation of components of the computing system 300. The components, units, or modules of the computing system 300 are coupled (physically, communicatively, and/or operatively) using communication channels for inter-component communications. In some examples, the communication channels may include a system bus, a network connection, an inter-process communication data structure, or any other method for communicating data.

The processors 302, in one example, may comprise one or more processors that are configured to implement functionality and/or process instructions for execution within the computing system 300. For example, processors 302 may be capable of processing instructions stored by storage units 310. Processors 302 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

The computing system 300 may utilize interfaces 304 to communicate with external systems via one or more networks, e.g., a customer service center. Interfaces 304 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, the computing system 300 utilizes interfaces 304 to wirelessly communicate with external systems, e.g., other computing devices or systems within emotion classification system 214 of FIG. 2.

Storage units 310 may be configured to store information within the computing system 300 during operation. Storage units 310 may include a computer-readable storage medium or computer-readable storage device. In some examples, storage units 310 include one or more of a short-term memory or a long-term memory. Storage units 310 may include, for example, random access memories (RAM), dynamic random-access memories (DRAM), static random-access memories (SRAM), magnetic discs, optical discs, flash memories, or forms of electrically programmable memories (EPROM) or electrically erasable and programmable memories (EEPROM). In some examples, storage units 310 are used to store program instructions for execution by processors 302. Storage units 310 may be used by software or applications running on the computing system 300 to temporarily store information during program execution.

Computing system 300 includes one or more machine learning models of DIVA indexer 10 and a training unit 320 used to train each of the machine learning models of DIVA indexer 10 using training data 312. As seen in FIG. 3, DIVA indexer 10 includes determination model 12, inquisitiveness model 14, valence model 16, and aggression model 18. The training unit 320 includes validation unit 322 and performance monitoring unit 324.

Machine learning algorithms or functions (e.g., a word embedding algorithm) are trained to create the machine learning models within DIVA indexer 10, configured to accept an input sequence of plain text data or text-based annotation data associated with a message and output, using determination model 12, inquisitiveness model 14, valence model 16, and aggression model 18, four emotion factor values including a determination value, an inquisitiveness value, a valence value, and an aggression value, where each value is an integer between −2 and 2 inclusive (although the integer range could consist of any range useful for the application) representing the intensity of the respective emotion contained within the message. For example, for each emotion factor value, −2 and −1 may be considered low values, while 1 and 2 may be considered high values. For example, a message could be scored with a determination value of negative one, a valence value of zero, an inquisitiveness value of two, and aggression value of two. The machine learning models within DIVA indexer 10 may generate emotion factor values based on text characteristics. For example, aggression model 18 may generate an aggression value of two for an incoming message if a set of text data associated with the incoming message has greater than a threshold level of similarity to known characteristics of messages with aggression values of two, as identified by aggression model 18.

Processors 302 may be configured to train each train each machine learning model of the set of machine learning models to determine the measure of the particular emotion factor of the set of emotion factors based on the set of training data.

For example, determination model 12 may be trained to determine a determination value based on input communication data representing a message. A machine learning model may be trained using a training process to create a data-specific model, such as determination model 12, based on training data 312. After the training process, the created model may be capable of determining an output data set based on an input data set (e.g., generate a determination value representing a level of determination emotion in a message based on communication data). The training process may implement a set of training data (e.g., training data 312) to create the model.

Determination model 12 may include functions configured to be executed by processors 302. In some examples, determination model 12 implements supervised learning, e.g., classifies sets of data into groups. For example, a set of data, such as communication data indicative of a message to a financial institution, may be classified with a determination value of negative two, negative one, zero, one, or two. In some examples, the function may include nodes, layers, and connections, and the function may be represented by equations having a plurality of variables and a plurality of known coefficients.

For example, determination model 12 may receive communication data in the form of plain-text or text-based annotation data and may parse the communication data to identify a sequence of items including any one or combination of words, phrases, characters (e.g., punctuation), and numerical values corresponding to a determination emotion and an intensity of the determination emotion. Determination model 12 may output a determination value comprised of an integer between −2 and 2 inclusive, where a higher number represents a higher determination emotion in the message. For example, a determination value of negative two may represent a lowest determination emotion within the message, a determination value of two may represent a highest determination emotion in the message, and a determination value of zero may represent a neutral determination emotion in the message. DIVA indexer 10 may store the determination value in an emotion factor index database 22 and assign an ID to the determination value to associate it with the message and the other emotion factor values generated for the message.

Processors 302 may be configured to create a set of training data 312 that includes a plurality of customer communications (i.e., messages), wherein each customer communication comprises communication data and a set of labels indicating the set of emotion factor values for the customer communication.

For example, training data 312 may include data indicative of a plurality of messages. At least some of the plurality of messages may represent customer complaints, responses, transcripts of calls or letters submitted to emotion classification system 214. The plurality of messages may include a group of messages with a determination value of negative 2, a group of messages with a determination value of negative one, a group of messages with a determination value of zero, a group of messages with a determination value of one, and a group of messages with a determination value of two, where each message of the plurality of messages is known to have a determination value of negative two, negative one, zero, one, or two. In one example, training data 312 contains data representing about equal numbers of messages with determination values of each number negative two through two. In another example, training data 312 contains data including a greater number of messages with a determination value of two than messages with a determination value of zero. In another example, training data 312 contains data including a greater number of messages with a determination value of zero than messages with a determination value of two. Other examples are contemplated wherein training data 312 contains data including a greater number of messages with any particular determination value than a number of messages with any other particular determination value. Training unit 320 may access training data 312 stored in storage units 310, and training unit 320 may train determination model 12 using training data 312.

Validation unit 322 may be configured to determine an accuracy of determination model 12. For example, validation unit 322 may use determination model 12 to determine if an example message corresponding to a known determination value has a determination value of negative two, negative one, zero, one, or two. Validation unit 322 may determine if determination model 12 was able to correctly score the incoming message. Additionally, validation unit 322 may be configured to determine the accuracy of determination model 12 for a plurality of messages example each corresponding to a determination value, and validation unit 322 may be configured to identify an accuracy (e.g., a success rate) in which determination model 12 correctly scores the messages for each determination value. If the accuracy is above a threshold accuracy value, determination model 12 may be used to classify incoming messages to emotion classification system 214. If the accuracy is below the threshold accuracy value, training unit 320 may re-train determination model 12 based on an updated set of training data. In some examples, the threshold accuracy value in which determination model 12 may be used may be greater than or equal to 90%. In some examples, validation unit 322 may be configured to identify an accuracy in which determination model 12 correctly scores the determination values of a plurality of messages.

Training unit 320 may include performance monitoring unit 324. Performance monitoring unit 324 may monitor a performance of determination model 12 after it is applied to score incoming messages to emotion classification system 214 (e.g., score the four emotion factor values as integers between −2 and 2 inclusive). In some examples, performance monitoring unit 324 may determine an accuracy of determination model 12 by comparing determination values scored by determination model 12 with known determination values of a plurality of messages. For example, if determination model 12 determines that an incoming message has a determination value of negative two, and the incoming message is discovered to have a determination value of one, performance monitoring unit 324 may record that an incorrect determination value was generated. Performance monitoring unit 324 may continuously monitor an accuracy of determination model 12. Performance monitoring unit 324 may determine a fraction of messages in which determination model 12 correctly scores an incoming message. The fraction may represent a measured accuracy of determination model 12. New messages may be analyzed by performance monitoring unit 324, the new messages representing data that was not used by training unit 320 to create determination model 12. In other words, performance monitoring unit 324 may test the accuracy of determination model 12 continuously using new data. In some examples, if performance monitoring unit 324 determines that the accuracy of determination model 12 is below a threshold accuracy value (e.g., 90%), performance monitoring unit 324 may output an instruction to re-train determination model 12.

Training unit 320 may periodically (e.g., monthly, bi-monthly, yearly, or the like) re-train determination model 12 based on an updated set of training data. The updated set of training data may include part or all of the plurality of messages of training data 312. Additionally, the updated set of training data may include a set of messages that are received by emotion classification system 214 during a time since determination model 12 was last trained by training unit 320.

Processors 302 may be configured to train each train each machine learning model of the set of machine learning models to determine the measure of the particular emotion factor of the set of emotion factors based on the set of training data.

For example, inquisitiveness model 14 may be trained to determine an inquisitiveness value based on input communication data representing a message. A machine learning model may be trained using a training process to create a data-specific model, such as inquisitiveness model 14, based on training data 312. After the training process, the created model may be capable of determining an output data set based on an input data set (e.g., generate an inquisitiveness value representing a level of inquisitive emotion in a message based on communication data). The training process may implement a set of training data (e.g., training data 312) to create the model.

Inquisitiveness model 14 may include functions configured to be executed by processors 302. In some examples, inquisitiveness model 14 implements supervised learning, e.g., classifies sets of data into groups. For example, a set of data, such as communication data indicative of a message to a financial institution, may be classified with an inquisitiveness value of negative two, negative one, zero, one, or two. In some examples, the function may include nodes, layers, and connections, and the function may be represented by equations having a plurality of variables and a plurality of known coefficients.

For example, inquisitiveness model 14 may receive communication data in the form of plain-text or text-based annotation data and may parse the communication data to identify a sequence of items including any one or combination of words, phrases, characters (e.g., punctuation), and numerical values corresponding to an inquisitive emotion and an intensity of the inquisitive emotion. Inquisitiveness model 14 may output an inquisitiveness value comprised of an integer between −2 and 2 inclusive, where a higher number represents a higher inquisitive emotion in the message. For example, an inquisitiveness value of negative two may represent a lowest inquisitive emotion within the message, an inquisitiveness value of two may represent a highest inquisitive emotion in the message, and an inquisitiveness value of zero may represent a neutral inquisitive emotion in the message. DIVA indexer 10 may store the inquisitiveness value in an emotion factor index database 22 and assign an ID to the inquisitiveness value to associate it with the message and the other emotion factor values generated for the message.

Processors 302 may be configured to create a set of training data 312 that includes a plurality of customer communications (i.e., messages), wherein each customer communication comprises communication data and a set of labels indicating the set of emotion factor values for the customer communication.

For example, training data 312 may include data indicative of a plurality of messages. At least some of the plurality of messages may represent customer complaints, responses, transcripts of calls or letters submitted to emotion classification system 214. The plurality of messages may include a group of messages with an inquisitiveness value of negative 2, a group of messages with an inquisitiveness value of negative one, a group of messages with an inquisitiveness value of zero, a group of messages with an inquisitiveness value of one, and a group of messages with an inquisitiveness value of two, where each message of the plurality of messages is known to have an inquisitiveness value of negative two, negative one, zero, one, or two. In one example, training data 312 contains data representing about equal numbers of messages with inquisitiveness values of each number negative two through two. In another example, training data 312 contains data including a greater number of messages with an inquisitiveness value of two than messages with an inquisitiveness value of zero. In another example, training data 312 contains data including a greater number of messages with an inquisitiveness value of zero than messages with an inquisitiveness value of two. Other examples are contemplated wherein training data 312 contains data including a greater number of messages with any particular inquisitiveness value than a number of messages with any other particular inquisitiveness value. Training unit 320 may access training data 312 stored in storage units 310, and training unit 320 may train inquisitiveness model 14 using training data 312.

Validation unit 322 may be configured to determine an accuracy of inquisitiveness model 14. For example, validation unit 322 may use inquisitiveness model 14 to determine if an example message corresponding to a known inquisitiveness value has an inquisitiveness value of negative two, negative one, zero, one, or two. Validation unit 322 may determine if inquisitiveness model 14 was able to correctly score the incoming message. Additionally, validation unit 322 may be configured to determine the accuracy of inquisitiveness model 14 for a plurality of messages example each corresponding to an inquisitiveness value, and validation unit 322 may be configured to identify an accuracy (e.g., a success rate) in which inquisitiveness model 14 correctly scores the messages for each inquisitiveness value. If the accuracy is above a threshold accuracy value, inquisitiveness model 14 may be used to classify incoming messages to emotion classification system 214. If the accuracy is below the threshold accuracy value, training unit 320 may re-train inquisitiveness model 14 based on an updated set of training data. In some examples, the threshold accuracy value in which inquisitiveness model 14 may be used may be greater than or equal to 90%. In some examples, validation unit 322 may be configured to identify an accuracy in which inquisitiveness model 14 correctly scores the inquisitiveness values of a plurality of messages.

Training unit 320 may include performance monitoring unit 324. Performance monitoring unit 324 may monitor a performance of inquisitiveness model 14 after it is applied to score incoming messages to emotion classification system 214 (e.g., score the four emotion factor values as integers between −2 and 2 inclusive). In some examples, performance monitoring unit 324 may determine an accuracy of inquisitiveness model 14 by comparing inquisitiveness values scored by inquisitiveness model 14 with known inquisitiveness values of a plurality of messages. For example, if inquisitiveness model 14 determines that an incoming message has an inquisitiveness value of negative two, and the incoming message is discovered to have an inquisitiveness value of one, performance monitoring unit 324 may record that an incorrect inquisitiveness value was generated. Performance monitoring unit 324 may continuously monitor an accuracy of inquisitiveness model 14. Performance monitoring unit 324 may determine a fraction of messages in which inquisitiveness model 14 correctly scores an incoming message. The fraction may represent a measured accuracy of inquisitiveness model 14. New messages may be analyzed by performance monitoring unit 324, the new messages representing data that was not used by training unit 320 to create inquisitiveness model 14. In other words, performance monitoring unit 324 may test the accuracy of inquisitiveness model 14 continuously using new data. In some examples, if performance monitoring unit 324 determines that the accuracy of inquisitiveness model 14 is below a threshold accuracy value (e.g., 90%), performance monitoring unit 324 may output an instruction to re-train inquisitiveness model 14.

Training unit 320 may periodically (e.g., monthly, bi-monthly, yearly, or the like) re-train inquisitiveness model 14 based on an updated set of training data. The updated set of training data may include part or all of the plurality of messages of training data 312. Additionally, the updated set of training data may include a set of messages that are received by emotion classification system 214 during a time since inquisitiveness model 14 was last trained by training unit 320.

Processors 302 may be configured to train each train each machine learning model of the set of machine learning models to determine the measure of the particular emotion factor of the set of emotion factors based on the set of training data.

For example, valence model 16 may be trained to determine a valence value based on input communication data representing a message. A machine learning model may be trained using a training process to create a data-specific model, such as valence model 16, based on training data 312. After the training process, the created model may be capable of determining an output data set based on an input data set (e.g., generate a valence value representing a level of negative or positive emotion in a message based on communication data). The training process may implement a set of training data (e.g., training data 312) to create the model.

Valence model 16 may include functions configured to be executed by processors 302. In some examples, valence model 16 implements supervised learning, e.g., classifies sets of data into groups. For example, a set of data, such as communication data indicative of a message to a financial institution, may be classified with a valence value of negative two, negative one, zero, one, or two. In some examples, the function may include nodes, layers, and connections, and the function may be represented by equations having a plurality of variables and a plurality of known coefficients.

For example, valence model 16 may receive communication data in the form of plain-text or text-based annotation data and may parse the communication data to identify a sequence of items including any one or combination of words, phrases, characters (e.g., punctuation), and numerical values corresponding to a positive or negative emotion and an intensity of the emotion. Valence model 16 may output a valence value comprised of an integer between −2 and 2 inclusive, where a higher number represents a more positive emotion in the message. For example, a valence value of negative two may represent a very negative emotion within the message, a valence value of two may represent a very positive emotion in the message, and a valence value of zero may represent a neutral emotion in the message. DIVA indexer 10 may store the valence value in an emotion factor index database 22 and assign an ID to the valence value to associate it with the message and the other emotion factor values generated for the message.

Processors 302 may be configured to create a set of training data 312 that includes a plurality of customer communications (i.e., messages), wherein each customer communication comprises communication data and a set of labels indicating the set of emotion factor values for the customer communication.

For example, training data 312 may include data indicative of a plurality of messages. At least some of the plurality of messages may represent customer complaints, responses, transcripts of calls or letters submitted to emotion classification system 214. The plurality of messages may include a group of messages with a valence value of negative 2, a group of messages with a valence value of negative one, a group of messages with a valence value of zero, a group of messages with a valence value of one, and a group of messages with a valence value of two, where each message of the plurality of messages is known to have a valence value of negative two, negative one, zero, one, or two. In one example, training data 312 contains data representing about equal numbers of messages with valence values of each number negative two through two. In another example, training data 312 contains data including a greater number of messages with a valence value of two than messages with a valence value of zero. In another example, training data 312 contains data including a greater number of messages with a valence value of zero than messages with a valence value of two. Other examples are contemplated wherein training data 312 contains data including a greater number of messages with any particular valence value than a number of messages with any other particular valence value. Training unit 320 may access training data 312 stored in storage units 310, and training unit 320 may train valence model 16 using training data 312.

Validation unit 322 may be configured to determine an accuracy of valence model 16. For example, validation unit 322 may use valence model 16 to determine if an example message corresponding to a known valence value has a valence value of negative two, negative one, zero, one, or two. Validation unit 322 may determine if valence model 16 was able to correctly score the incoming message. Additionally, validation unit 322 may be configured to determine the accuracy of valence model 16 for a plurality of messages example each corresponding to a valence value, and validation unit 322 may be configured to identify an accuracy (e.g., a success rate) in which valence model 16 correctly scores the messages for each valence value. If the accuracy is above a threshold accuracy value, valence model 16 may be used to classify incoming messages to emotion classification system 214. If the accuracy is below the threshold accuracy value, training unit 320 may re-train valence model 16 based on an updated set of training data. In some examples, the threshold accuracy value in which valence model 16 may be used may be greater than or equal to 90%. In some examples, validation unit 322 may be configured to identify an accuracy in which valence model 16 correctly scores the valence values of a plurality of messages.

Training unit 320 may include performance monitoring unit 324. Performance monitoring unit 324 may monitor a performance of valence model 16 after it is applied to score incoming messages to emotion classification system 214 (e.g., score the four emotion factor values as integers between −2 and 2 inclusive). In some examples, performance monitoring unit 324 may determine an accuracy of valence model 16 by comparing valence values scored by valence model 16 with known valence values of a plurality of messages. For example, if valence model 16 determines that an incoming message has a valence value of negative two, and the incoming message is discovered to have a valence value of one, performance monitoring unit 324 may record that an incorrect valence value was generated. Performance monitoring unit 324 may continuously monitor an accuracy of valence model 16. Performance monitoring unit 324 may determine a fraction of messages in which valence model 16 correctly scores an incoming message. The fraction may represent a measured accuracy of valence model 16. New messages may be analyzed by performance monitoring unit 324, the new messages representing data that was not used by training unit 320 to create valence model 16. In other words, performance monitoring unit 324 may test the accuracy of valence model 16 continuously using new data. In some examples, if performance monitoring unit 324 determines that the accuracy of valence model 16 is below a threshold accuracy value (e.g., 90%), performance monitoring unit 324 may output an instruction to re-train valence model 16.

Training unit 320 may periodically (e.g., monthly, bi-monthly, yearly, or the like) re-train valence model 16 based on an updated set of training data. The updated set of training data may include part or all of the plurality of messages of training data 312. Additionally, the updated set of training data may include a set of messages that are received by emotion classification system 214 during a time since valence model 16 was last trained by training unit 320.

Processors 302 may be configured to train each train each machine learning model of the set of machine learning models to determine the measure of the particular emotion factor of the set of emotion factors based on the set of training data.

For example, aggression model 18 may be trained to determine an aggression value based on input communication data representing a message. A machine learning model may be trained using a training process to create a data-specific model, such as aggression model 18, based on training data 312. After the training process, the created model may be capable of determining an output data set based on an input data set (e.g., generate an aggression value representing a level of aggressive emotion in a message based on communication data). The training process may implement a set of training data (e.g., training data 312) to create the model.

Aggression model 18 may include functions configured to be executed by processors 302. In some examples, aggression model 18 implements supervised learning, e.g., classifies sets of data into groups. For example, a set of data, such as communication data indicative of a message to a financial institution, may be classified with an aggression value of negative two, negative one, zero, one, or two. In some examples, the function may include nodes, layers, and connections, and the function may be represented by equations having a plurality of variables and a plurality of known coefficients.

For example, aggression model 18 may receive communication data in the form of plain-text or text-based annotation data and may parse the communication data to identify a sequence of items including any one or combination of words, phrases, characters (e.g., punctuation), and numerical values corresponding to an aggressive emotion and an intensity of the aggressive emotion. Aggression model 18 may output an aggression value comprised of an integer between −2 and 2 inclusive, where a higher number represents a higher aggressive emotion in the message. For example, an aggression value of negative two may represent a lowest aggressive emotion within the message, an aggression value of two may represent a highest aggressive emotion in the message, and an aggression value of zero may represent a neutral aggressive emotion in the message. DIVA indexer 10 may store the aggression value in an emotion factor index database 22 and assign an ID to the aggression value to associate it with the message and the other emotion factor values generated for the message.

Processors 302 may be configured to create a set of training data 312 that includes a plurality of customer communications (i.e., messages), wherein each customer communication comprises communication data and a set of labels indicating the set of emotion factor values for the customer communication.

For example, training data 312 may include data indicative of a plurality of messages. At least some of the plurality of messages may represent customer complaints, responses, transcripts of calls or letters submitted to emotion classification system 214. The plurality of messages may include a group of messages with an aggression value of negative 2, a group of messages with an aggression value of negative one, a group of messages with an aggression value of zero, a group of messages with an aggression value of one, and a group of messages with an aggression value of two, where each message of the plurality of messages is known to have an aggression value of negative two, negative one, zero, one, or two. In one example, training data 312 contains data representing about equal numbers of messages with aggression values of each number negative two through two. In another example, training data 312 contains data including a greater number of messages with an aggression value of two than messages with an aggression value of zero. In another example, training data 312 contains data including a greater number of messages with an aggression value of zero than messages with an aggression value of two. Other examples are contemplated wherein training data 312 contains data including a greater number of messages with any particular aggression value than a number of messages with any other particular aggression value. Training unit 320 may access training data 312 stored in storage units 310, and training unit 320 may train aggression model 18 using training data 312.

Validation unit 322 may be configured to determine an accuracy of aggression model 18. For example, validation unit 322 may use aggression model 18 to determine if an example message corresponding to a known aggression value has an aggression value of negative two, negative one, zero, one, or two. Validation unit 322 may determine if aggression model 18 was able to correctly score the incoming message. Additionally, validation unit 322 may be configured to determine the accuracy of aggression model 18 for a plurality of messages example each corresponding to an aggression value, and validation unit 322 may be configured to identify an accuracy (e.g., a success rate) in which aggression model 18 correctly scores the messages for each aggression value. If the accuracy is above a threshold accuracy value, aggression model 18 may be used to classify incoming messages to emotion classification system 214. If the accuracy is below the threshold accuracy value, training unit 320 may re-train aggression model 18 based on an updated set of training data. In some examples, the threshold accuracy value in which aggression model 18 may be used may be greater than or equal to 90%. In some examples, validation unit 322 may be configured to identify an accuracy in which aggression model 18 correctly scores the aggression values of a plurality of messages.

Training unit 320 may include performance monitoring unit 324. Performance monitoring unit 324 may monitor a performance of aggression model 18 after it is applied to score incoming messages to emotion classification system 214 (e.g., score the four emotion factor values as integers between −2 and 2 inclusive). In some examples, performance monitoring unit 324 may determine an accuracy of aggression model 18 by comparing aggression values scored by aggression model 18 with known aggression values of a plurality of messages. For example, if aggression model 18 determines that an incoming message has an aggression value of negative two, and the incoming message is discovered to have an aggression value of one, performance monitoring unit 324 may record that an incorrect aggression value was generated. Performance monitoring unit 324 may continuously monitor an accuracy of aggression model 18. Performance monitoring unit 324 may determine a fraction of messages in which aggression model 18 correctly scores an incoming message. The fraction may represent a measured accuracy of aggression model 18. New messages may be analyzed by performance monitoring unit 324, the new messages representing data that was not used by training unit 320 to create aggression model 18. In other words, performance monitoring unit 324 may test the accuracy of aggression model 18 continuously using new data. In some examples, if performance monitoring unit 324 determines that the accuracy of aggression model 18 is below a threshold accuracy value (e.g., 90%), performance monitoring unit 324 may output an instruction to re-train aggression model 18.

Training unit 320 may periodically (e.g., monthly, bi-monthly, yearly, or the like) re-train aggression model 18 based on an updated set of training data. The updated set of training data may include part or all of the plurality of messages of training data 312. Additionally, the updated set of training data may include a set of messages that are received by emotion classification system 214 during a time since aggression model 18 was last trained by training unit 320.

In some examples, the business or organization may be a financial institution, and training data 312 may include data exclusively from a financial institution context. For example, the plurality of messages contained within training data 312 may all be messages to a financial institution. In this manner, training data 312 may be used to train the machine learning models of DIVA indexer 10 to be most effective in the financial institution context.

Computing system 300 may receive plain text data of communication data indicative of a current communication associated with a customer. Computing system 300 may then apply the communication data to an emotion-based indexer as input. For example, processors of computing system 300 may be configured to input the plain text data of the communication data to DIVA indexer 10. The emotion-based indexer may include a set of machine learning models for a set of emotion factor values, wherein each machine learning model is trained to determine a measure of a particular emotion factor of the set of emotion factors. For example, DIVA indexer 10 may include determination model 12 trained to determine a determination value, inquisitiveness model 14 trained to determine an inquisitiveness value, valence model 16 trained to determine a valence value, and aggression model 18 trained to determine an aggression value. Computing system 300 may apply the communication data for the current communication as input to each of the four machine learning models of DIVA indexer 10 (i.e., determination model 12, inquisitiveness model 14, valence model 16, and aggression model 18). Computing system 300 may generate, as output from the emotion-based indexer, a set of emotion factor values for the current communication, wherein each emotion factor value of the set of emotion factor values indicates the measure of the particular emotion factor in the current communication. For example, DIVA indexer 10 may output the four emotion factor values, where each value indicates the measure of its respective emotion factor (i.e., an amount of determination, inquisitiveness, valence, and aggression). Processors 302 may be configured to indicate, as output from each machine learning model of DIVA indexer 10, the corresponding emotion factor value for the current communication (i.e., the determination value, inquisitiveness value, valence value, and aggression value).

In addition, computing system 300 may store the emotion factor values in emotion factor index database 22. Computing system 300 may then send the emotion factor values, e.g., using interfaces 304, to another computing system executing an emotion classification model 220 configured to classify the customer communication into an emotion state based on the set of emotion factor values for the current communication associated with the customer.

Figure 4:
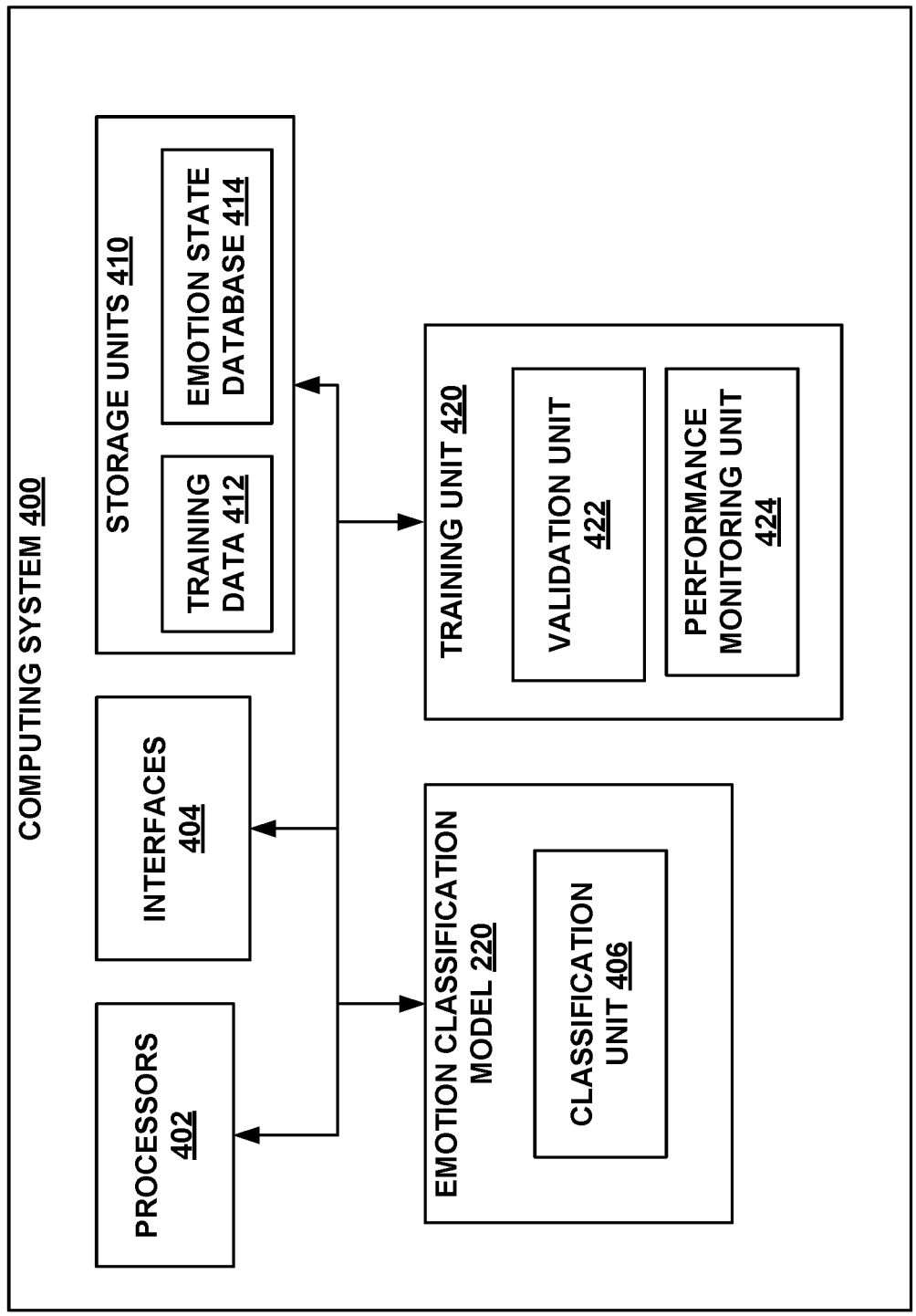
FIG. 4 is a block diagram illustrating an example computing system for running an emotion classification model, in accordance with the techniques of this disclosure.

FIG. 4 is a block diagram illustrating an example computing system 400 for running an emotion classification model 220, in accordance with the techniques of this disclosure. The architecture of computing system 400 illustrated in FIG. 4 is shown for exemplary purposes only. Computing system 400 should not be limited to the illustrated example architecture. In other examples, computing system 400 may be configured in a variety of ways. Although computing system 300 and computing system 400 are illustrated herein as separate systems, in other examples DIVA indexer 10 and emotion classification model 220 may be run on a single, shared computing system.

Computing system 400 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 400 represents a cloud computing system, server farm, and/or server cluster (or portion thereof) that provides services to customer devices and other devices or systems. In other examples, computing system 400 may represent or be implemented through one or more virtualized compute instances (e.g., virtual machines, containers) of a data center, cloud computing system, server farm, and/or server cluster.

As shown in the example of FIG. 4, a computing system 400 includes one or more processors 402, one or more interfaces 404, and one or more storage units 410. The one or more storage units 410 may store training data 412, and/or emotion state database 414. The computing system 400 also includes the emotion classification model 220, and a training unit 420, which may be implemented as program instructions and/or data stored in the storage units 410 and executable by the processors 402.

The storage units 410 of the computing system 400 may also store an operating system (not shown) executable by the processors 402 to control the operation of components of the computing system 400. The components, units, or modules of the computing system 400 are coupled (physically, communicatively, and/or operatively) using communication channels for inter-component communications. In some examples, the communication channels may include a system bus, a network connection, an inter-process communication data structure, or any other method for communicating data.

The processors 402, in one example, may comprise one or more processors that are configured to implement functionality and/or process instructions for execution within the computing system 400. For example, processors 402 may be capable of processing instructions stored by storage units 410. Processors 402 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Computing system 400 may utilize interfaces 404 to communicate with external systems via one or more networks, e.g., a customer service center. Interfaces 404 may be network interfaces (such as Ethernet interfaces, optical transceivers, radio frequency (RF) transceivers, Wi-Fi or Bluetooth radios, or the like), telephony interfaces, or any other type of devices that can send and receive information. In some examples, the computing system 400 utilizes interfaces 404 to wirelessly communicate with external systems, e.g., other computing devices or systems within emotion classification system 214 of FIG. 2.

Storage units 410 may be configured to store information within the computing system 400 during operation. Storage units 410 may include a computer-readable storage medium or computer-readable storage device. In some examples, storage units 410 include one or more of a short-term memory or a long-term memory. Storage units 410 may include, for example, random access memories (RAM), dynamic random-access memories (DRAM), static random access memories (SRAM), magnetic discs, optical discs, flash memories, or forms of electrically programmable memories (EPROM) or electrically erasable and programmable memories (EEPROM). In some examples, storage units 410 are used to store program instructions for execution by processors 402. Storage units 410 may be used by software or applications running on the computing system 400 to temporarily store information during program execution.

Computing system 400 includes a machine learning emotion classification model 220 with a classification unit 406. Computing system 400 also includes a training unit 420. As seen in FIG. 4, training unit 420 includes validation unit 422 and performance monitoring unit 424.

In some examples, computing system 400 may receive a set of emotion factor values for a current communication associated with a customer and apply the set of emotion factor values for the current communication to emotion classification model 220 as input. The set of emotion factor values may include a determination value, an inquisitiveness value, a valence value, and an aggression value. Computing system 400 may retrieve, e.g., using interfaces 404, the emotion factor values associated with the current communication from emotion factor index database 22. In some examples, emotion classification model 220 may be configured to classify the current communication into an emotion state based on the set of emotion factor values for the current communication associated with the customer. Emotion classification model 220 may receive one or more of the emotion factor values as input and output an emotion state. In some examples, the emotion state may be a text string (e.g., "frustrated," "angry," "curious," "cheerful") indicative of the emotive content of the communication. In some examples, the emotion state may be a number (e.g., between one and ten) representing the negativity or positivity of the message, where messages classified in category one have the most positive content and messages in category ten have the most negative content. The emotion state may be stored in an emotion state database 414 and associated with the current communication. Computing system 400 may send the emotion state as associated with the customer communication to one or more agent devices for use in determining how to handle the current communication. In this way, emotion classification model 220 may allow agents of the business or organization to handle customer communications more efficiently.

In some examples, emotion classification model 220 may be configured to classify a current communication into an emotion state based on a set of emotion factor values for the current communication associated with a customer, as well as one or more historic emotion factor value sets from the emotion factor index database 22 corresponding to historic communications associated with the customer over time, where the historic communications occurred prior to the current communication. Computing system 400 may retrieve, e.g., using interfaces 404, a current set of emotion factor values associated with a current communication from emotion factor index database 22. In some examples, computing system 400 may receive the current set of emotion factor values from DIVA indexer 10. Computing system 400 may retrieve historic emotion factor values for historic communications associated with a customer over time from emotion factor index database 22. Emotion classification model 220 may receive the one or more sets of emotion factor values as input and output an emotion state. The emotion state may be stored in an emotion state database 414 and associated with the current communication. In this way, emotion classification model 220 may take into account the emotive content of past customer communications for a given customer when classifying a current communication for the given customer into an emotion state.

Emotion classification model 220 may include functions configured to be executed by processors 402. In some examples, emotion classification model 220 implements supervised learning, e.g., classifies sets of data into groups. For example, a set of data, such as a set of one or more emotion factor values indicative of the emotive content in a communication sent to a business or organization (e.g., a financial institution), may be classified with an emotion state. In some examples, the function may include nodes, layers, and connections, and the function may be represented by equations having a plurality of variables and a plurality of known coefficients.

Machine learning algorithms, such as some examples of emotion classification model 220, may be trained using a training process to create data-specific models, such as emotion classification model 220 based on training data 412. After the training process, the created model may be capable of determining an output data set based on an input data set (e.g., classify a communication into an emotion state based on a set of one or more emotion factor values). The training process may implement a set of training data (e.g., training data 412) to create the model.

Training data 412 may include data indicative of a plurality of sets of emotion factor values. At least some of the plurality of sets of emotion factor values may represent the emotive content of customer communications submitted to computing system 400.

In some examples training data 312 may include data exclusively from a financial institution context. For example, the plurality of communication data contained within training data 312 may all be communication data for messages or communications to a financial institution. In this way, the training of the machine learning models within DIVA indexer 10 may be more specific to financial institutions and more accurate in identifying emotive content in communications with a financial institution.

Processors 402 may be configured to create a set of training data that includes a plurality of communications, wherein each communication of the plurality of communications comprises a corresponding set of emotion factor values and a label identifying an associated emotion state.

In one example, the plurality of sets of emotion factor values may include a group of sets of emotion factor values labeled with a first emotion state, a group of sets of emotion factor values labeled with a second emotion state, and so on for each emotion state of a plurality of emotion states, where each group of sets of emotion factor values of the plurality of sets of emotion factor values is known to have a particular emotion state. In some examples, training data 412 contains data representing about equal numbers of sets of emotion factor values labeled with each emotion state of the plurality of emotion states. In another example, training data 412 contains data including a greater number of sets of emotion factor values labeled with a first emotion state than a number of sets of emotion factor values labeled with a second emotion state. Other examples are contemplated wherein training data 412 contains data including a greater number of sets of emotion factor values labeled with any particular emotion state than a number of sets of emotion factor values labeled with any other particular emotion state.

In some examples, a machine learning algorithm or function (e.g., a word embedding algorithm) is trained to create the emotion classification model 220 configured to accept an input set of emotion factor values associated with a current customer communication for a particular customer and output, using classification unit 406, an emotion state classification for the customer communication indicative of the emotive content of the communication. For example, emotion classification model 220 may output classifications based on mapped patterns of emotion factor values. For example, emotion classification model 220 may classify a current communication as "cheerful" if the input set of emotion factor values associated with the current communication has a greater than threshold level of similarity to known characteristics of sets of emotion factor values classified as "cheerful", as identified by classification unit 406 with reference to emotion state database 414. Training unit 420 may output emotion states to storage units 410.

Validation unit 422 may be configured to determine an accuracy of emotion classification model 220. In some examples, validation unit 422 may use emotion classification model 220 to determine if example sets of emotion factor values for customer communications correspond to a known emotion state classification. Validation unit 422 may determine if emotion classification model 220 is able to correctly classify the set of emotion factor values. Additionally, validation unit 422 may be configured to determine the accuracy of emotion classification model 220 for a plurality of example emotion state classifications each corresponding to one or more sets of emotion factor values associated with customer communications, and validation unit 422 may be configured to identify an accuracy (e.g., a success rate) in which emotion classification model 220 correctly classifies the one or more sets of emotion factor values for each emotion state. If the accuracy is above a threshold accuracy value, emotion classification model 220 may be used to classify sets of emotion factor values output by DIVA indexer 10. If the accuracy is below the threshold accuracy value, training unit 420 may re-train emotion classification model 220 based on an updated set of training data. In some examples, the threshold accuracy value in which emotion classification model 220 may be used may be greater than or equal to 90%. In some examples, validation unit 422 may be configured to identify an accuracy in which emotion classification model 220 correctly classifies a plurality of sets of emotion factor values into emotion states.

Training unit 420 may include performance monitoring unit 424. Performance monitoring unit 424 may monitor a performance of emotion classification model 220 after it is applied to classify communications based on sets of emotion factor values.

In some examples, performance monitoring unit 424 may determine an accuracy of emotion classification model 220 by comparing emotion state classifications generated by emotion classification model 220 with known emotion state classifications of a plurality of sets of emotion factor values. For example, if emotion classification model 220 classifies an incoming set of emotion factor values into an emotion state of "cheerful," and the set of emotion factor values is discovered to have a classification of "angry," performance monitoring unit 424 may record that a communication was classified into an incorrect emotion state. Performance monitoring unit 424 may continuously monitor an accuracy of emotion classification model 220. Performance monitoring unit 424 may determine a fraction of sets of emotion factor values in which emotion classification model 220 correctly classifies a communication into an emotion state. The fraction may represent a measured accuracy of the model. New sets of emotion factor values may be analyzed by performance monitoring unit 424, the new sets of emotion factor values representing data that was not used by training unit 420 to create the model. In other words, performance monitoring unit 424 may test the accuracy of the model continuously using new data. In some examples, if performance monitoring unit 424 determines that the accuracy of emotion classification model 220 is below a threshold accuracy value (e.g., 90%), performance monitoring unit 424 may output an instruction to re-train emotion classification model 220.

Training unit 420 may periodically (e.g., monthly, bi-monthly, yearly, or the like) re-train emotion classification model 220 based on an updated set of training data. The updated set of training data may include part or all of the plurality of sets of emotion factor values of training data 412. Additionally, the updated set of training data may include a plurality of sets of emotion factor values for communications that are received by computing system 400 during a time since emotion classification model 220 was last trained by training unit 420.

Emotion classification model 220 or computing system 400 may transmit the emotion state to one or more agent devices for use in determining how to handle the current communication. In some examples, emotion classification model 220 or computing system 400 may transmit the emotion state automatically from emotion classification model 220 or emotion state database 414 to one or more agent devices after receiving a customer communication and classifying the communication with the emotion state. In some examples, an agent operating the one or more agent devices may request the emotion state from emotion state database 414 when the agent is ready to begin work associated with the communication. In some examples, the one or more agent devices and/or computing system 400 may retrieve the emotion state for a customer communication from emotion state database 414 when considering whether to solicit to the customer associated with the message, when determining what order in which to respond to customer messages, when determining whether a customer message may be fraudulent, when routing a customer message to a particular agent or agents capable of most effectively responding to the customer, when considering loan risks for the customer, or in any other scenario where the emotion state may assist in the decisions and processes of the business or organization.

Figure 5:
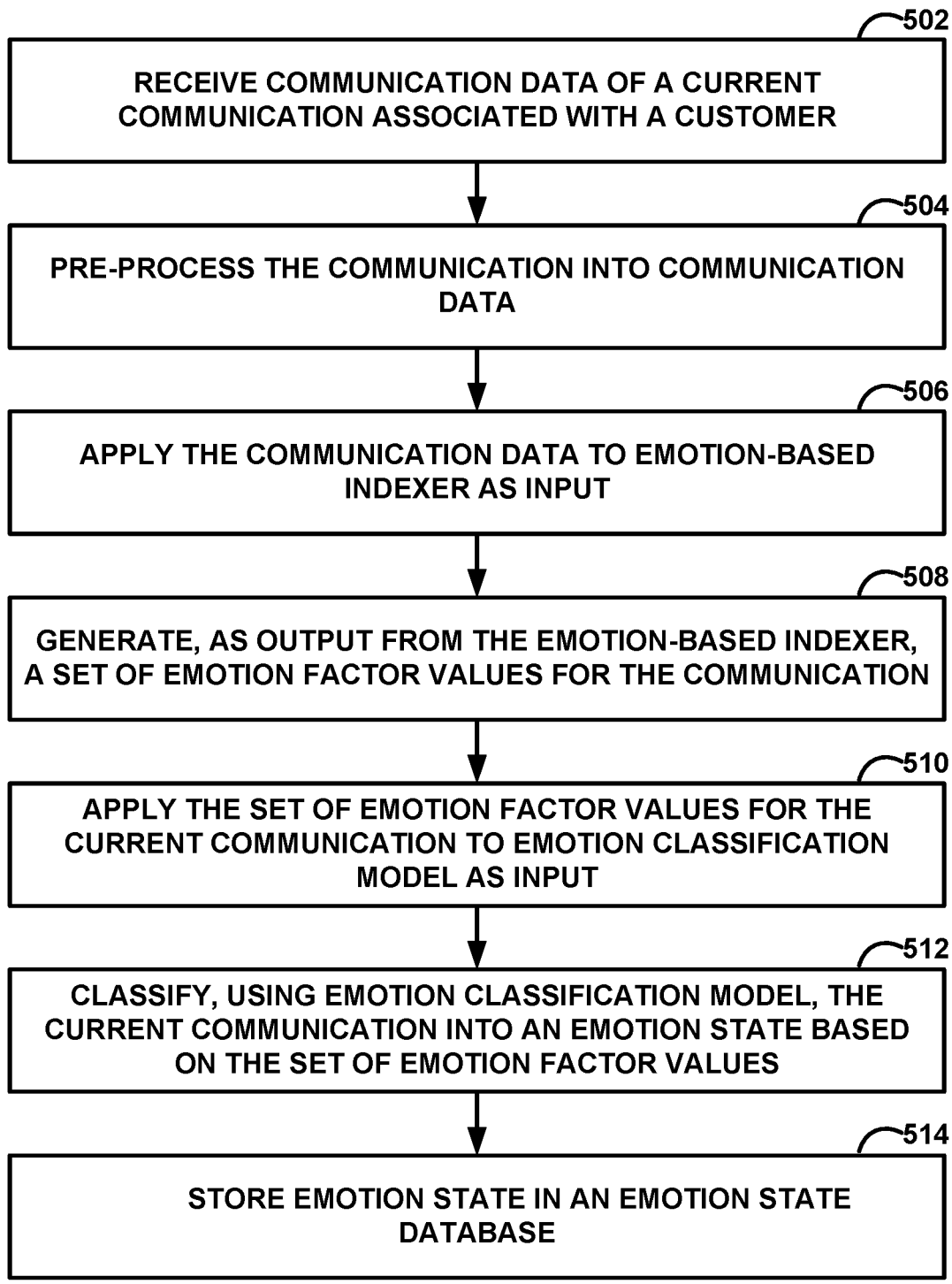
FIG. 5 is a flow diagram illustrating an example process for classifying a current communication into an emotion state, in accordance with the techniques of this disclosure.

FIG. 5 is a flow diagram illustrating an example process for classifying a current communication into an emotion state, in accordance with the techniques of this disclosure. The example process of FIG. 5 may be performed by emotion classification system 214 of FIG. 2, including DIVA indexer 10, e.g., running on computing system 300 of FIG. 3, emotion classification model 220, e.g., running on computing system 400 of FIG. 4, and/or processing circuitry of one or more agent device.

Emotion classification system 214 associated with an organization or business receives communication data representing a current customer communication from a customer that can be used to determine the emotive content of the communication (502). The customer may send the current communication from user device 206 to one or more servers or other computing devices of emotion classification system 214. The current communication may be in the form of a text, call, letter, email, or other form of communication.

Once emotion classification system 214 receives the current communication, data pre-processor 2 may pre-process the current communication into communication data for further processing (504). The communication data may be in plain text format, where data pre-processor 2 digitally transcribes audio messages into plain text format, or an employee of the organization manually transcribes the audio message into plain text format. In some examples, data pre-processor 2 transcribes visual data (from scanned documents, pdf files, image files etc.) into plain text format, or an employee of the organization manually transcribes visual data into plain text format. Data pre-processor 2 may include a speech recognition model, e.g., a natural language processing (NLP) engine, configured to convert audio customer service inquiries to plain text data via natural language processing. In other examples, data pre-processor 2 may include a text image recognition model configured to convert hand- or typewritten customer service inquiries to plain text data or text-based annotation data.

Processors of computing system 300 may apply the processed communication data as input to DIVA indexer 10 (506). DIVA indexer 10 includes multiple machine learning models, including a determination model 12, inquisitiveness model 14, valence model 16, and aggression model 18. Applying the communication data as input to DIVA indexer 10 may include applying the communication data as input to each of the machine learning models of DIVA indexer 10. The machine learning models within DIVA indexer 10 may accept plain text or text-based annotation data as input, where the communication data received is associated with a single communication submitted by the customer. Each machine learning model of DIVA indexer 10 may be trained to determine a measure of a particular emotion factor of the set of emotion factors.

DIVA indexer 10 generates, as output, a current set of emotion factor values, where each of the machine learning models within DIVA indexer 10 is configured to generate a single emotion factor value as output (508). Each emotion factor value of the set of emotion factor values may indicate the measure of the particular emotion factor in the current communication. For example, each of the emotion factor values may be indicative of an emotive intensity present in the communication data. For example, determination model 12 may generate a determination value comprising an integer between −2 and 2 (inclusive). A determination value of −2 may indicate that the customer communication conveys a low determination, where the customer may feel undecided on an issue. A determination value of 2 may indicate that the customer communication conveys a high determination value, where the customer may feel fixated on an issue. Similarly, inquisitiveness model 14 may generate an inquisitiveness value, valence model 16 may generate a valence value, and aggression model 18 may generate an aggression value, where each emotion factor value may be an integer between −2 and 2 (inclusive), representing the intensity of the respective emotion as conveyed in the customer communication. The four emotion factor values may be saved in an emotion factor index database 22 as associated with the communication data and the customer who sent the current communication.

Processors of computing system 400 may apply the set or sets of emotion factor values for the current communication to emotion classification model 220 as input (510). The processors may retrieve the one or more sets of emotion factor values associated with the customer from the emotion factor index database 22, or may receive the one or more sets of emotion factor values from DIVA indexer 10. Emotion classification model 220 may be a machine learning model or a business rule-based model. In some examples, emotion classification model retrieves the current set of emotion factor values, as well as historic sets of emotion factor values from emotion factor index database 22.

Emotion classification model 220 then classifies the current communication into an emotion state based on the one or more sets of emotion factor values associated with the customer (512). In some examples emotion classification model 220 is a machine learning model, trained as described below with respect to FIG. 7 to classify a communication into an emotion state indicative of the emotive content of the communication. In some examples, the emotion state may be a text string (e.g., "frustrated," "angry," "curious," "cheerful") indicative of the emotive content of the communication. In some examples, the emotion state may be a number (e.g., between one and ten) representing the negativity or positivity of the message, where messages classified in category one have the most positive content and messages in category ten have the most negative content.

Emotion classification model 220 or emotion classification system 214 may store the emotion state in an emotion state database 414 as associated with the communication (514). Emotion classification system 214 retrieve the emotion state as associated with the customer communication and send the emotion state to one or more agent devices for use in determining how to handle the communication. In this way, emotion classification model 220 may allow agents of the business or organization to handle customer communications more efficiently. In some examples, an agent operating one or more agent devices 224 may request the emotion state from emotion state database 414 when the agent is ready to begin work associated with the message. In some examples, agent devices 224 and/or emotion classification system may retrieve the emotion state for a customer message from emotion state database 414 when considering whether to solicit to the customer associated with the message, when determining what order in which to respond to customer messages, when determining whether a customer message may be fraudulent, when routing a customer message to a particular agent or agents capable of most effectively responding to the customer, when considering loan risks for the customer, or in any other scenario where the emotion state may assist in the decisions and processes of the business or organization.

Figure 6:
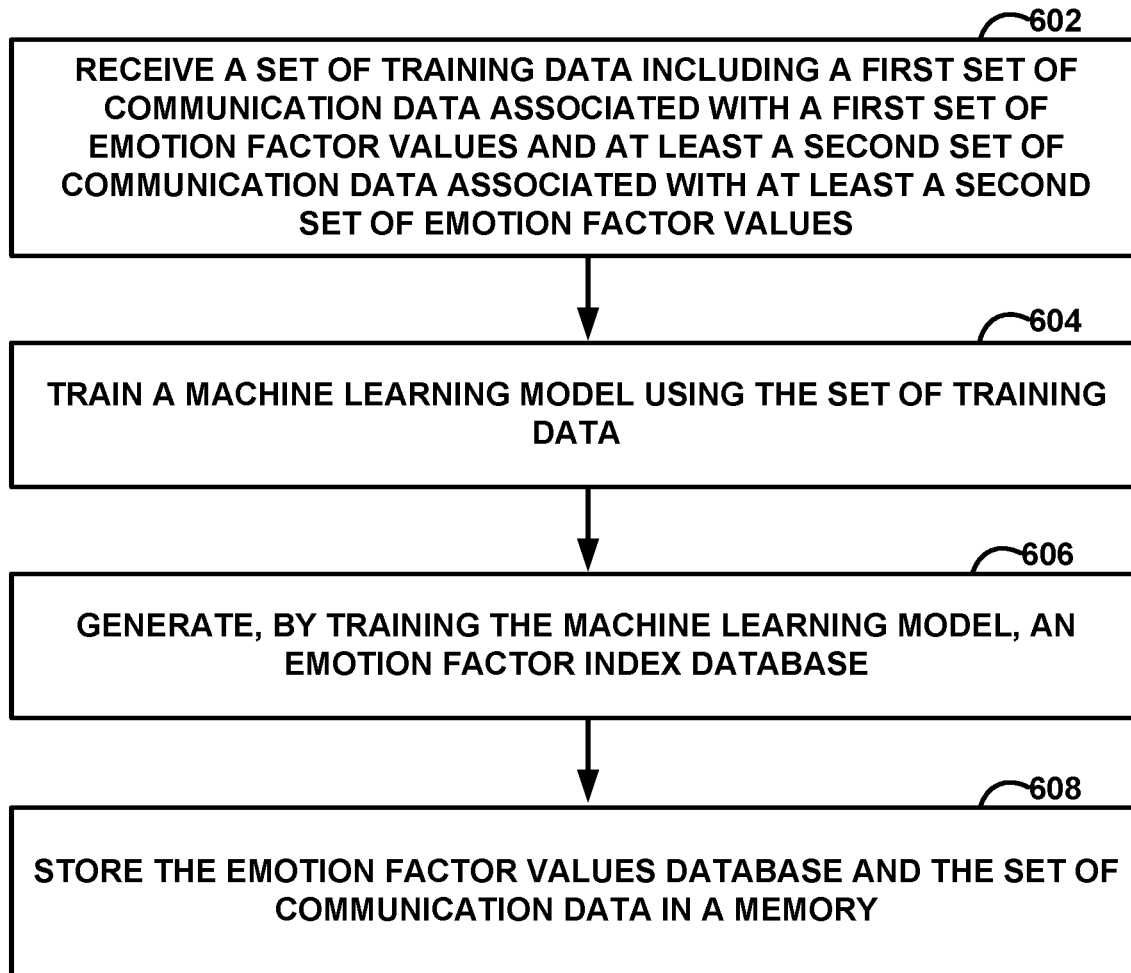
FIG. 6 is a flow diagram illustrating an example process for training an emotion-based indexer machine learning model, in accordance with the techniques of this disclosure.

FIG. 6 is a flow diagram illustrating an example process for training an emotion-based indexer machine learning model, in accordance with the techniques of this disclosure. The example operation of FIG. 6 is described with respect to computing system 300 of FIG. 3 including DIVA indexer 10 and training unit 320. The emotion-based indexer may comprise determination model 12, inquisitiveness model 14, valence model 16, and aggression model 18 within DIVA indexer 10. Each model within DIVA indexer 10 may need to be trained individually with communication data labeled with their respective emotion factor values.

Training unit 320 may receive a set of training data 312 including data indicative of a first set of communication data associated with a first set of emotion factor values and at least a second set of communication data associated with a second set of emotion factor values (602). Computing system 300 may create the set of training data including a plurality of customer communications in storage units 310, and a plurality of sets of emotion factor values wherein each customer communication includes communication data and a set of labels indicating the values for a corresponding set of emotion factor values for the customer communication. The sets of emotion factor values may each be comprised of a determination value, an inquisitiveness value, a valence value, and an aggression value, where each emotion factor value is comprised of an integer between negative two and two inclusive. In some examples, the first set of emotion factor values has different integer values than the second set of emotion factor values. In some examples, the set of communication data associated with the first set of emotion factor values may be approximately equal in size to the set of communication data associated with the second set of emotion factor values.

Training unit 320 may train the machine learning models within DIVA indexer 10 using training data 312 (604). Training unit 320 may train each machine learning model of the set of machine learning models to determine the measure of the particular emotion factor of the set of emotion factors based on the set of training data. Determination model 12 may be trained to determine a determination value based on input communication data representing a message. A machine learning model may be trained using a training process to create a data-specific model, such as determination model 12, based on training data 312. After the training process, determination model 12 may be capable of outputting a determination value representing a level of determination emotion in a message based on an input of communication data. The training process may implement a set of training data (e.g., training data 312) to create determination model 12. Computing system 300 may create the set of training data from a plurality of customer communications in storage units 310, and a plurality of determination values in emotion factor index database 22 wherein each customer communication includes communication data and a label indicating the corresponding determination value.

Training data 312 may include a plurality of sets of communication data and emotion factor values as described above, wherein the determination values from the sets of emotion factor values are used to train determination model 12. The plurality of sets of communication data may include a group of communication data labeled with a determination value of negative 2, a group of communication data labeled with a determination value of negative one, a group of communication data labeled with a determination value of zero, a group of communication data labeled with a determination value of one, and a group of communication data labeled with a determination value of two, where each group of communication data of the plurality of sets of communication data is known to be labeled with a determination value of negative two, negative one, zero, one, or two. In one example, training data 312 contains data representing about equal numbers of sets of communication data labeled with determination values of each number negative two through two. In another example, training data 312 contains data including a greater number of sets of communication data labeled with a determination value of two than sets of communication data labeled with a determination value of zero. Other examples are contemplated wherein training data 312 contains data including an equal to or greater number of sets of communication data labeled with any particular determination value than a number of sets of communication data labeled with any other particular determination value. Training unit 320 may access training data 312 stored in storage units 310, and training unit 320 may train determination model 12 using training data 312.

Inquisitiveness model 14 may be trained to determine an inquisitiveness value based on input communication data representing a message. A machine learning model may be trained using a training process to create a data-specific model, such as inquisitiveness model 14, based on training data 312. After the training process, inquisitiveness model 14 may be capable of outputting an inquisitiveness value representing a level of inquisitiveness emotion in a message based on an input of communication data. The training process may implement a set of training data (e.g., training data 312) to create inquisitiveness model 14. Computing system 300 may create the set of training data from a plurality of customer communications in storage units 310, and a plurality of inquisitiveness values in emotion factor index database 22 wherein each customer communication includes communication data and a label indicating the corresponding inquisitiveness value.

Training data 312 may include a plurality of sets of communication data and emotion factor values as described above, wherein the inquisitiveness values from the sets of emotion factor values are used to train inquisitiveness model 14. The plurality of sets of communication data may include a group of communication data labeled with an inquisitiveness value of negative 2, a group of communication data labeled with an inquisitiveness value of negative one, a group of communication data labeled with an inquisitiveness value of zero, a group of communication data labeled with an inquisitiveness value of one, and a group of communication data labeled with an inquisitiveness value of two, where each group of communication data of the plurality of sets of communication data is known to be labeled with an inquisitiveness value of negative two, negative one, zero, one, or two. In one example, training data 312 contains data representing about equal numbers of sets of communication data labeled with inquisitiveness values of each number negative two through two. In another example, training data 312 contains data including a greater number of sets of communication data labeled with an inquisitiveness value of two than sets of communication data labeled with an inquisitiveness value of zero. Other examples are contemplated wherein training data 312 contains data including an equal to or greater number of sets of communication data labeled with any particular inquisitiveness value than a number of sets of communication data labeled with any other particular inquisitiveness value. Training unit 320 may access training data 312 stored in storage units 310, and training unit 320 may train inquisitiveness model 14 using training data 312.

Valence model 16 may be trained to determine a valence value based on input communication data representing a message. A machine learning model may be trained using a training process to create a data-specific model, such as valence model 16, based on training data 312. After the training process, valence model 16 may be capable of outputting a valence value representing a level of valence emotion in a message based on an input of communication data. The training process may implement a set of training data (e.g., training data 312) to create valence model 16. Computing system 300 may create the set of training data from a plurality of customer communications in storage units 310, and a plurality of valence values in emotion factor index database 22 wherein each customer communication includes communication data and a label indicating the corresponding valence value.

Training data 312 may include a plurality of sets of communication data and emotion factor values as described above, wherein the valence values from the sets of emotion factor values are used to train valence model 16. The plurality of sets of communication data may include a group of communication data labeled with a valence value of negative 2, a group of communication data labeled with a valence value of negative one, a group of communication data labeled with a valence value of zero, a group of communication data labeled with a valence value of one, and a group of communication data labeled with a valence value of two, where each group of communication data of the plurality of sets of communication data is known to be labeled with a valence value of negative two, negative one, zero, one, or two. In one example, training data 312 contains data representing about equal numbers of sets of communication data labeled with valence values of each number negative two through two. In another example, training data 312 contains data including a greater number of sets of communication data labeled with a valence value of two than sets of communication data labeled with a valence value of zero. Other examples are contemplated wherein training data 312 contains data including an equal to or greater number of sets of communication data labeled with any particular valence value than a number of sets of communication data labeled with any other particular valence value. Training unit 320 may access training data 312 stored in storage units 310, and training unit 320 may train valence model 16 using training data 312.

Aggression model 18 may be trained to determine an aggression value based on input communication data representing a message. A machine learning model may be trained using a training process to create a data-specific model, such as aggression model 18, based on training data 312. After the training process, aggression model 18 may be capable of outputting an aggression value representing a level of aggression emotion in a message based on an input of communication data. The training process may implement a set of training data (e.g., training data 312) to create aggression model 18. Computing system 300 may create the set of training data from a plurality of customer communications in storage units 310, and a plurality of aggression values in emotion factor index database 22 wherein each customer communication includes communication data and a label indicating the corresponding aggression value.

Training data 312 may include a plurality of sets of communication data and emotion factor values as described above, wherein the aggression values from the sets of emotion factor values are used to train aggression model 18. The plurality of sets of communication data may include a group of communication data labeled with an aggression value of negative 2, a group of communication data labeled with an aggression value of negative one, a group of communication data labeled with an aggression value of zero, a group of communication data labeled with an aggression value of one, and a group of communication data labeled with an aggression value of two, where each group of communication data of the plurality of sets of communication data is known to be labeled with an aggression value of negative two, negative one, zero, one, or two. In one example, training data 312 contains data representing about equal numbers of sets of communication data labeled with aggression values of each number negative two through two. In another example, training data 312 contains data including a greater number of sets of communication data labeled with an aggression value of two than sets of communication data labeled with an aggression value of zero. Other examples are contemplated wherein training data 312 contains data including an equal to or greater number of sets of communication data labeled with any particular aggression value than a number of sets of communication data labeled with any other particular aggression value. Training unit 320 may access training data 312 stored in storage units 310, and training unit 320 may train aggression model 18 using training data 312.

By training the machine learning models within DIVA indexer 10, training unit 320 may generate an emotion factor index database 22 (606). The emotion factor index database 22 may include a plurality of emotion factor value sets, where each emotion factor value set of the plurality of emotion factor value sets corresponds to a respective message or communication data. Communication data may include words of the English language or other languages, single numerals, groups of single numerals, numerical strings, groups of numerical strings, single characters, groups of single characters, character strings, or groups of character strings in plain text format. As such, using emotion factor index database 22, the machine learning models within DIVA indexer 10 may determine a set of emotion factor values for a message or communication data. Training unit 320 may store emotion factor index database 22 in storage units 310 (608).

Figure 7:
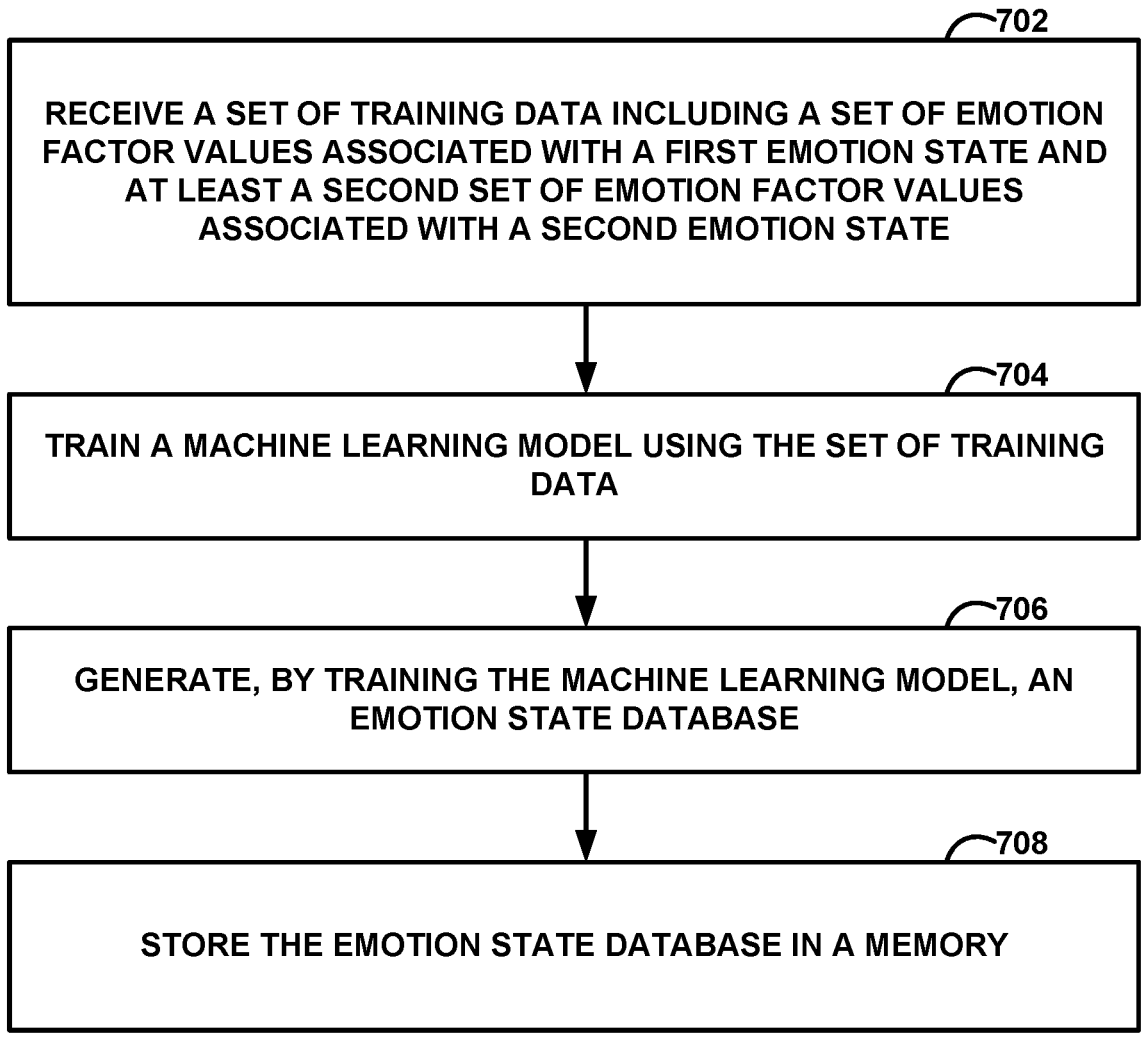
FIG. 7 is a flow diagram illustrating an example process for training an emotion classification model, in accordance with the techniques of this disclosure.

FIG. 7 is a flow diagram illustrating an example process for training an emotion classification model 220, in accordance with the techniques of this disclosure. The example operation of FIG. 7 is described with respect to computing system 400 of FIG. 4 including the machine learning model, emotion classification model 220, and training unit 420.

The emotion classification model 220 machine learning model may be trained to classify a communication into an emotion state indicative of the emotive content of the communication based on a set of emotion factor values for the communication data associated with the communication.

Training unit 420 may receive a set of training data 412 including a group of sets of emotion factor values associated with customer communications and labeled with a first emotion state, and a group of sets of emotion factor values associated with customer communications and labeled with a second emotion state (702). In some examples, the group of sets of emotion factor values labeled with the first emotion state may be approximately equal in size to the group of sets of emotion factor values labeled with the second emotion state. Computing system 400 may create the set of training data 412 from a plurality of sets of emotion factor values in emotion factor index database 22 and a plurality of emotion states in emotion state database 414, wherein each set of emotion factor values of the plurality of sets of emotion factor values includes a label indicating the corresponding emotion state.

Training unit 420 may train emotion classification model 220 using training data 412 (704). In a first example, emotion classification model 220 may be trained to classify a communication into an emotion state based on an input set of emotion factor values associated with the communication. In a second example, emotion classification model 220 may be trained to classify a communication into an emotion state based on an input set of emotion factor values associated with the communication and one or more input sets of historical emotion factor values associated with historical communications of the customer associated with the communication. A machine learning algorithm may be trained using a training process to create a data-specific model, such as emotion classification model 220 based on training data 412. After the training process, emotion classification model 220 may be capable of classifying a communication into an emotion state based on a set of emotion factor values in a first example, or emotion classification model 220 may be capable of classifying a communication into an emotion state based on a set of emotion factor values and one or more sets of historic emotion factor values in a second example. The training process may implement a set of training data (e.g., training data 412) to create the emotion classification model 220.

Training data 412 may include data indicative of a plurality of sets of emotion factor values labeled with a plurality of emotion states, wherein the plurality of sets of emotion factor values labeled with a plurality of emotion states comprises a first set of emotion factor values labeled with a first emotion state and at least a second set of emotion factor values labeled with a second emotion state. The plurality of sets of emotion factor values may include a particular number of groups (e.g., ten groups) of sets of emotion factor values where each of the groups includes data that is labeled with a particular emotion state. In one example, training data 412 contains data representing about equal numbers of sets of emotion factor values labeled with each emotion state. In another example, training data 412 contains data including a greater number of sets of emotion factor values labeled with a first emotion state than a number of sets of emotion factor values labeled with a second emotion state. Other examples are contemplated wherein training data 412 contains data including a greater number of sets of emotion factor values labeled with any particular emotion state than a number of sets of emotion factor values labeled with any other particular emotion state. Training unit 420 may access training data 412 stored in storage units 410, and training unit 420 may train the emotion classification model 220 using training data 412.

By training emotion classification model 220, training unit 420 may generate an emotion state database 414 (706). The emotion state database 414 may include a plurality of emotion states, where each emotion state of the plurality of emotion states corresponds to one or more sets of emotion factor values associated with customer communications. Each emotion state of the plurality of emotion states is associated with an emotive content of a communication. Using emotion state database 414, emotion classification model 220 may classify a communication into an emotion state indicative of the emotive content of the communication.

Training unit 420 may store emotion state database 414 in storage units 410 (708). Computing system 400 may retrieve an emotion state associated with a customer communication and send the emotion state to one or more agent devices for use in determining how to handle the communication. In this way, emotion classification model 220 may allow agents of the business or organization to handle customer communications more efficiently. In some examples, an agent operating one or more agent devices may request the emotion state for a customer communication from emotion state database 414 when the agent is ready to begin work associated with the communication. In some examples, agent devices and/or computing system 400 may retrieve the emotion state for a customer message from emotion state database 414 when considering whether to solicit to the customer associated with the message, when determining what order in which to respond to customer messages, when determining whether a customer message may be fraudulent, when routing a customer message to a particular agent or agents capable of most effectively responding to the customer, when considering loan risks for the customer, or in any other scenario where the emotion state may assist in the decisions and processes of the business or organization.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing system comprising:
a memory; and one or more processors in communication with the memory and configured to:
create a set of training data including a plurality of customer communications, each customer communication associated with at least one of a plurality of emotion factor values, wherein each emotion factor value of the plurality of emotion factor values indicates a measure of a different emotion factor in a communication;
train each machine learning model of a set of machine learning models included in an emotion-based indexer, based on the set of training data, to determine the measure of the different emotion factor as a particular emotion factor value of the plurality of emotion factor values, wherein each machine learning model is trained to output the particular emotion factor value of the plurality of emotion factor values based on input communication data;
receive communication data of a current communication associated with a customer;
apply the communication data to the emotion-based indexer running on the one or more processors as input;
generate, as output from the emotion-based indexer, a set of emotion factor values for the current communication, wherein the set of emotion factor values comprises a determination value for the current communication, an inquisitiveness value for the current communication, a valence value for the current communication, and an aggression value for the current communication;
apply the set of emotion factor values for the current communication to an emotion classification model running on the one or more processors as input;
apply one or more historic sets of emotion factor values stored in a database to the emotion classification model as input, wherein the one or more historic sets of emotion factor values correspond to communication data of one or more historic communications associated with the customer over time, the historic communications occurring prior to the current communication; and
classify, using the emotion classification model, the current communication into an emotion state based on the set of emotion factor values for the current communication associated with the customer and the one or more historic sets of emotion factor values for the one or more historic communications associated with the customer.

2. The computing system of claim 1, wherein the one or more processors are further configured to store the set of emotion factor values for the current communication in the database.

3. The computing system of claim 1, wherein the set of machine learning models comprises a determination model trained to determine the determination value in the current communication, an inquisitiveness model trained to determine the inquisitiveness value in the current communication, a valence model trained to determine the valence value in the current communication, and an aggression model trained to determine the aggression value in the current communication.

4. The computing system of claim 3, wherein to determine the determination value, the one or more processors are configured to:
apply the communication data for the current communication to the determination model as input; and
indicate, as output from the determination model, the determination value for the current communication.

5. The computing system of claim 3, wherein to determine the inquisitiveness value, the one or more processors are configured to:
apply the communication data for the current communication to the inquisitiveness model as input; and
indicate, as output from the inquisitiveness model, the inquisitiveness value for the current communication.

6. The computing system of claim 3, wherein to determine the valence value, the one or more processors are configured to:
apply the communication data for the current communication to the valence model as input; and
indicate, as output from the valence model, the valence value for the current communication.

7. The computing system of claim 3, wherein to determine the aggression value, the one or more processors are configured to:
apply the communication data for the current communication to the aggression model as input; and
indicate, as output from the aggression model, the aggression value for the current communication.

8. The computing system of claim 1, wherein each customer communication of the plurality of customer communications included in the set of training data comprises communication data and a set of labels indicating the set of emotion factor values for the customer communication.

9. The computing system of claim 1, wherein the emotion classification model comprises a machine learning model, and wherein to classify the current communication into the emotion state, the one or more processors are configured to:
apply the set of emotion factor values for the current communication and the one or more historic sets of emotion factor values for the one or more historic communications to the emotion classification model as input; and
determine, as output from the emotion classification model, the emotion state for the current communication.

10. The computing system of claim 9, wherein the set of training data comprises a first set of training data, and wherein the one or more processors are configured to:
create a second set of training data that includes a plurality of communications, wherein each communication of the plurality of communications comprises a corresponding set of emotion factor values and a label identifying an associated emotion state; and
train the machine learning model of the emotion classification model based on the second set of training data.

11. The computing system of claim 1, wherein the one or more processors are further configured to transmit the emotion state to one or more agent devices for use in determining how to handle the current communication.

12. A method comprising:
creating, by one or more processors, a set of training data including a plurality of customer communications, each customer communication associated with at least one of a plurality of emotion factor values, wherein each emotion factor value of the plurality of emotion factor values indicates a measure of a different emotion factor in a communication;
training, by the one or more processors, each machine learning model of a set of machine learning models included in an emotion-based indexer, based on the set of training data, to determine the measure of the different emotion factor as a particular emotion factor value of the plurality of emotion factor values, wherein each machine learning model is trained to output the particular emotion factor value of the plurality of emotion factor values based on input communication data;

receiving, by the one or more processors, communication data of a current communication associated with a customer;

applying, by the one or more processors, the communication data to the emotion-based indexer running on the one or more processors as input;

generating, by the one or more processors, as output from the emotion-based indexer, a set of emotion factor values for the current communication, wherein the set of emotion factor values comprises a determination value for the current communication, an inquisitiveness value for the current communication, a valence value for the current communication, and an aggression value for the current communication;

applying, by the one or more processors, the set of emotion factor values for the current communication to an emotion classification model running on the one or more processors as input;

applying, by the one or more processors, one or more historic sets of emotion factor values stored in a database to the emotion classification model as input, wherein the one or more historic sets of emotion factor values correspond to communication data of one or more historic communications associated with the customer over time, the historic communications occurring prior to the current communication; and classifying, by the one or more processors, using the emotion classification model, the current communication into an emotion state based on the set of emotion factor values for the current communication associated with the customer and the one or more historic sets of emotion factor values for the one or more historic communications associated with the customer.

13. The method of claim 12, wherein the set of machine learning models comprises a determination model trained to determine the determination value in the current communication, an inquisitiveness model trained to determine the inquisitiveness value in the current communication, a valence model trained to determine the valence value in the current communication, and an aggression model trained to determine the aggression value in the current communication.

14. The method of claim 12, wherein each customer communication of the plurality of customer communications included in the set of training data comprises communication data and a set of labels indicating the set of emotion factor values for the customer communication.

15. The method of claim 12, wherein the emotion classification model comprises a machine learning model, and wherein classifying the current communication into an emotion state comprises:
applying the set of emotion factor values for the current communication and the one or more historic sets of emotion factor values for the one or more historic communications to the emotion classification model as input; and
determining, as output from the emotion classification model, the emotion state for the current communication.

16. The method of claim 15, wherein the set of training data comprises a first set of training data, the method further comprising:
creating a second set of training data that includes a plurality of communications, wherein each communication of the plurality of communications comprises a corresponding set of emotion factor values and a label identifying an associated emotion state; and
training the machine learning model of the emotion classification model based on the second set of training data.

17. The method of claim 12, further comprising transmitting the emotion state to one or more agent devices for use in determining how to handle the current communication.

18. A non-transitory computer-readable medium comprising instructions that, when executed, cause one or more processors to:
create a set of training data including a plurality of customer communications, each customer communication associated with at least one of a plurality of emotion factor values, wherein each emotion factor value of the plurality of emotion factor values indicates a measure of a different emotion factor in a communication;
train each machine learning model of a set of machine learning models included in an emotion-based indexer, based on the set of training data, to determine the measure of the different emotion factor as a particular emotion factor value of the plurality of emotion factor values, wherein each machine learning model is trained to output the particular emotion factor value of the plurality of emotion factor values based on input communication data;
receive communication data of a current communication associated with a customer;
apply the communication data to the emotion-based indexer running on the one or more processors as input;
generate, as output from the emotion-based indexer, a set of emotion factor values for the current communication, wherein the set of emotion factor values comprises a determination value for the current communication, an inquisitiveness value for the current communication, a valence value for the current communication, and an aggression value for the current communication;
apply the set of emotion factor values for the current communication to an emotion classification model running on the one or more processors as input;
apply one or more historic sets of emotion factor values stored in a database to the emotion classification model as input, wherein the one or more historic sets of emotion factor values correspond to communication data of one or more historic communications associated with the customer over time, the historic communications occurring prior to the current communication; and
classify, using the emotion classification model, the current communication into an emotion state based on the set of emotion factor values for the current communication associated with the customer and the one or more historic sets of emotion factor values for the one or more historic communications associated with the customer.

* * * * *